(12) United States Patent
Ohyama

(10) Patent No.: US 10,228,569 B2
(45) Date of Patent: *Mar. 12, 2019

(54) DISPLAY DEVICE

(71) Applicant: Japan Display Inc., Tokyo (JP)

(72) Inventor: Tsuyoshi Ohyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,140

(22) Filed: Nov. 13, 2017

(65) Prior Publication Data

US 2018/0067328 A1  Mar. 8, 2018

Related U.S. Application Data

(63) Continuation of application No. 13/403,050, filed on Feb. 23, 2012, now Pat. No. 9,851,573.

(30) Foreign Application Priority Data

Mar. 15, 2011 (JP) ................................. 2011-056992

(51) Int. Cl.
*G02B 27/22* (2018.01)
*H04N 13/31* (2018.01)
(52) U.S. Cl.
CPC ......... *G02B 27/2214* (2013.01); *H04N 13/31* (2018.05)
(58) Field of Classification Search
CPC ................ G02B 27/2214; G02B 27/26; G02B 27/2228; G02B 27/2235; H04N 13/0239;
(Continued)

(56) References Cited

U.S. PATENT DOCUMENTS 6,124,909 A   9/2000 Miyashita et al.
7,742,134 B2  6/2010 Hu et al.
(Continued)

FOREIGN PATENT DOCUMENTS

CN    1186257 A   7/1998
CN    1754392 A   3/2006
(Continued)

OTHER PUBLICATIONS

Japanese Office Action dated Nov. 15, 2016 for corresponding Japanese Application No. 2011-056992.

(Continued)

*Primary Examiner* — Jie Lei
(74) *Attorney, Agent, or Firm* — Michael Best & Friedrich LLP

(57) ABSTRACT

A display device includes a display unit in which pixels having first and second regions are arrayed in a matrix, the first region emitting first color light for displaying a stereoscopic image including images of a plurality of viewing points and the second region emitting second color light in order to display the stereoscopic image. A separation unit separates optically the images of the respective viewing points from each other so that the images of different viewing points are observed by different eyes of a viewer, wherein in a region on the display unit in which the image of a predetermined viewing point is displayed, widths of the first and second regions in a parallax direction of the stereoscopic image are approximately the same and widths of the first and second regions in a vertical direction, which is approximately perpendicular to the parallax direction, are different.

5 Claims, 13 Drawing Sheets

(58) Field of Classification Search
CPC ........... H04N 13/0497; H04N 13/0431; H04N 13/0409; H04N 13/31
USPC ....... 359/462–464; 348/42, 51, 60; 345/419, 345/589, 593, 653, 664
See application file for complete search history.

(56) References Cited

U.S. PATENT DOCUMENTS

| | | | |
|---|---|---|---|
| 9,851,573 B2* | 12/2017 | Ohyama | ................ H04N 13/31 |
| 2005/0001787 A1 | 1/2005 | Montgomery et al. | |
| 2005/0280602 A1 | 12/2005 | Tzschoppe | |
| 2006/0082519 A1 | 4/2006 | Nam | |
| 2010/0117528 A1 | 5/2010 | Fukuda | |
| 2010/0118045 A1 | 5/2010 | Elliott | |

FOREIGN PATENT DOCUMENTS

| | | |
|---|---|---|
| JP | 08-331605 A | 12/1996 |
| JP | 2000-187231 A | 7/2000 |
| JP | 2002-341335 A | 11/2002 |
| JP | 2007-156126 A | 6/2007 |
| JP | 2005-018073 A | 3/2008 |
| JP | 2008-058602 A | 3/2008 |
| JP | 2011-505017 A | 2/2011 |

OTHER PUBLICATIONS

S. Uehara et al., "High-definition 2D/3D Display," NEC Technical Journal, vol. 62 No. 2/2009, pp. 48-52.
Chinese Office Action dated Jan. 16, 2015, for corresponding Chinese Application No. 2012-100592950.
Japanese Office Action dated Aug. 26, 2014, for corresponding Japanese Application No. 2011-056992.
Japanese Office Action dated Jan. 27, 2015, for corresponding Japanese Application No. 2011-056992.
Japanese Office Action, Decision on Refusal, dated Sep. 8, 2015, for corresponding Japanese Application No. 2011-056992.
Japanese Office Action, Decision to Dismiss the Amendment dated Sep. 8, 2015, for corresponding Japanese Application No. 2011-056992.
English translation of JP 2005-018073, machine translated on Sep. 25, 2014.

* cited by examiner

FIG.3
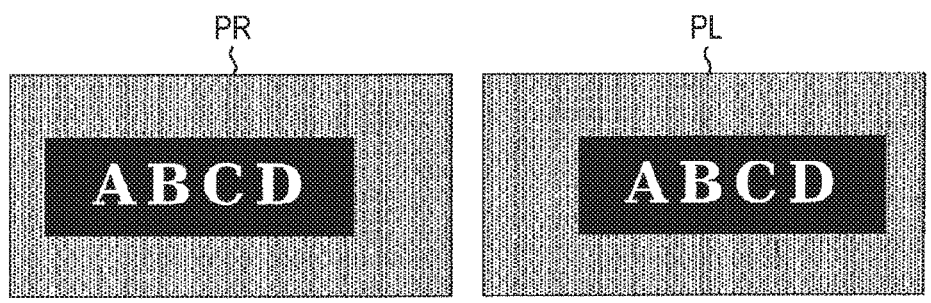
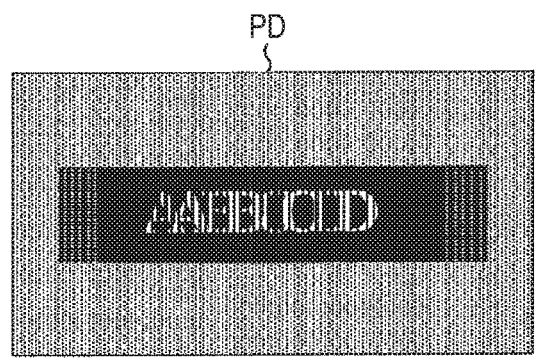

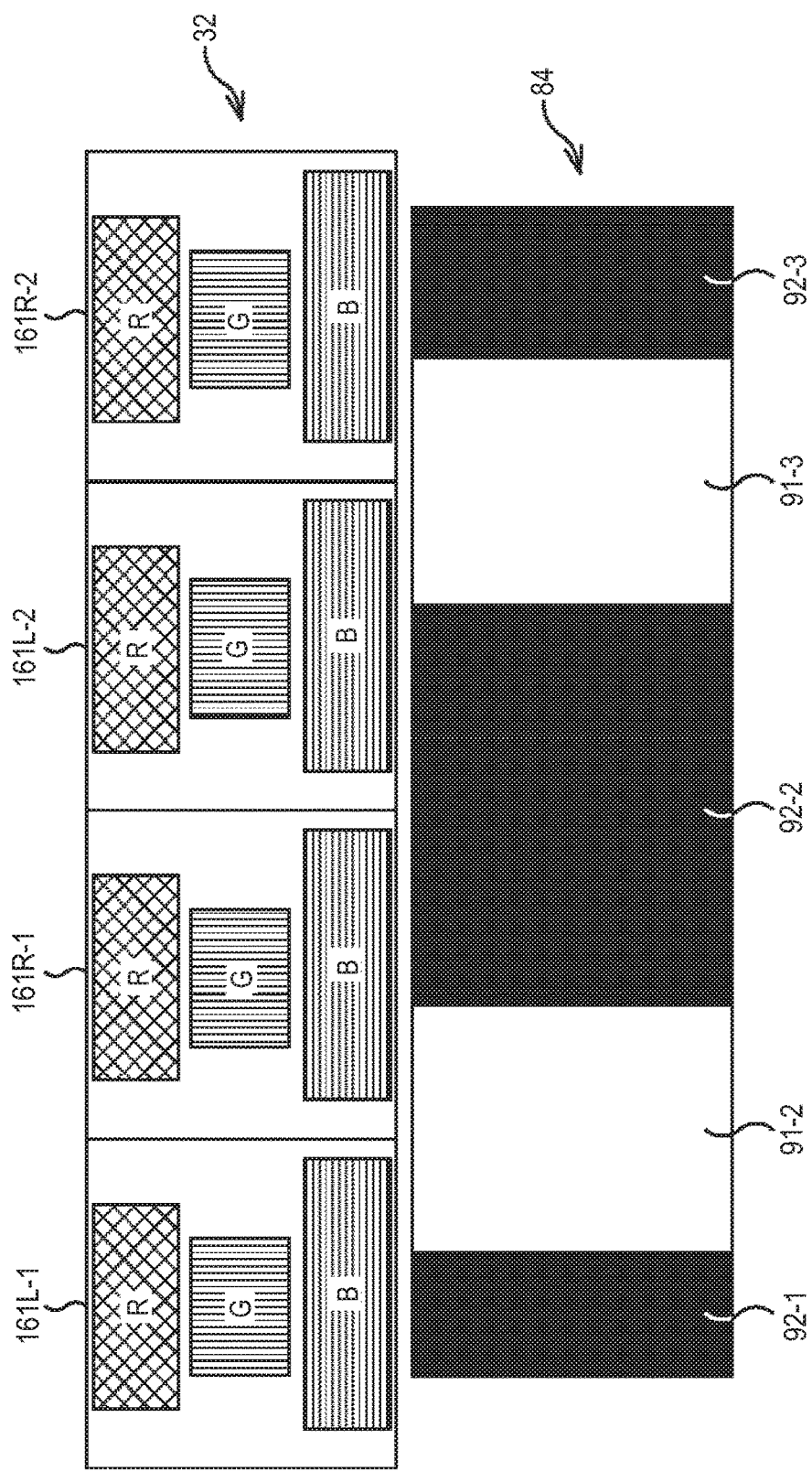

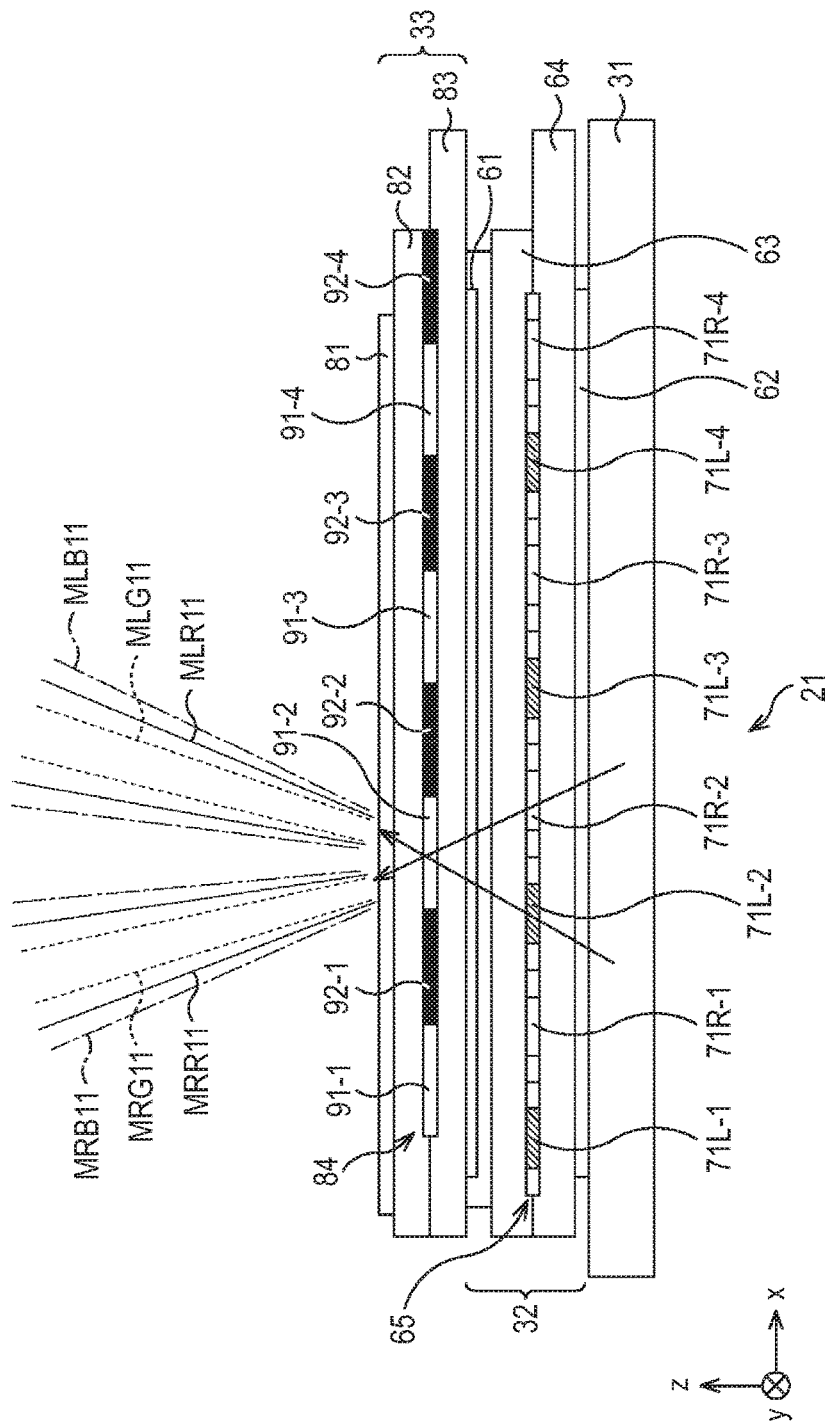

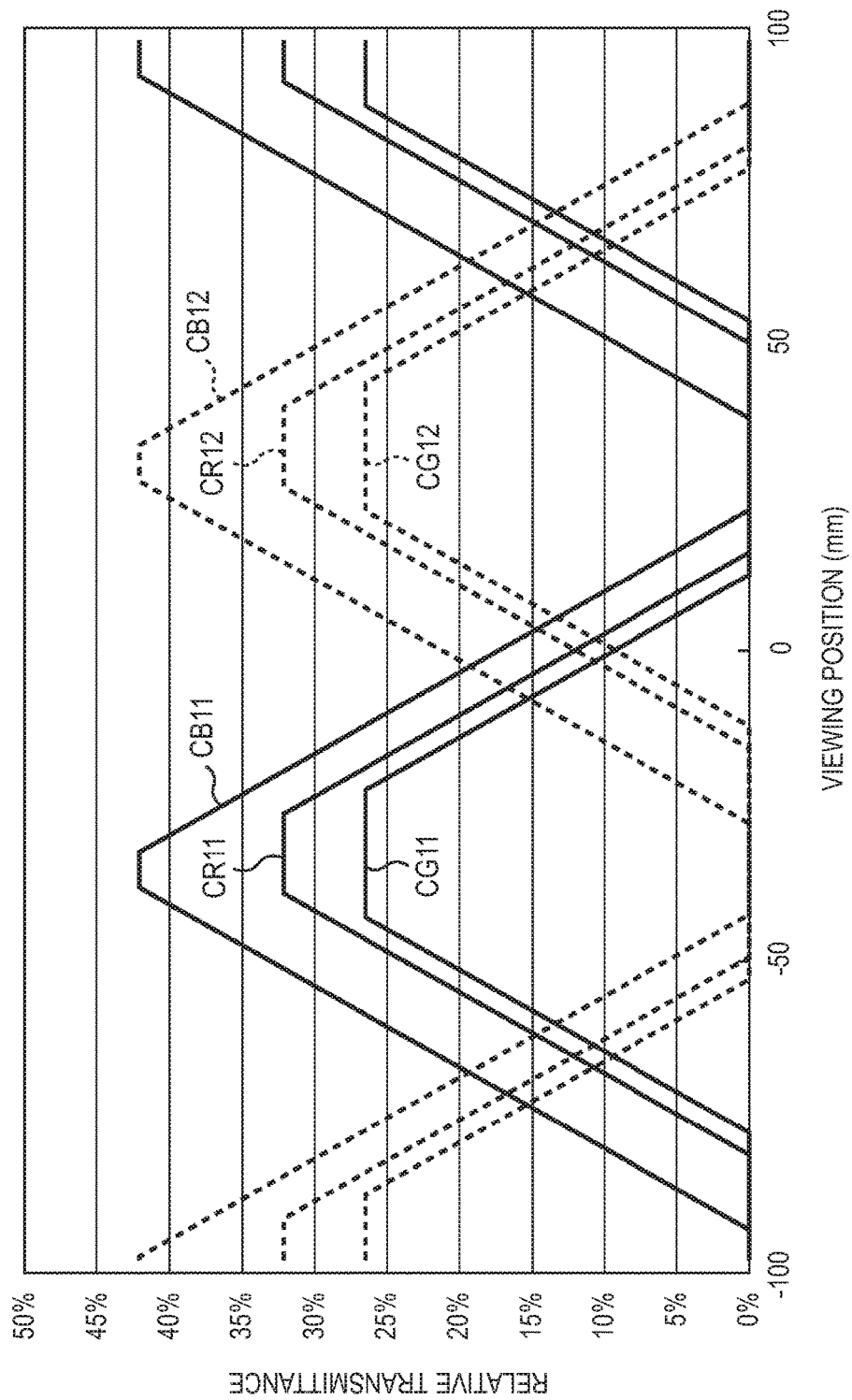

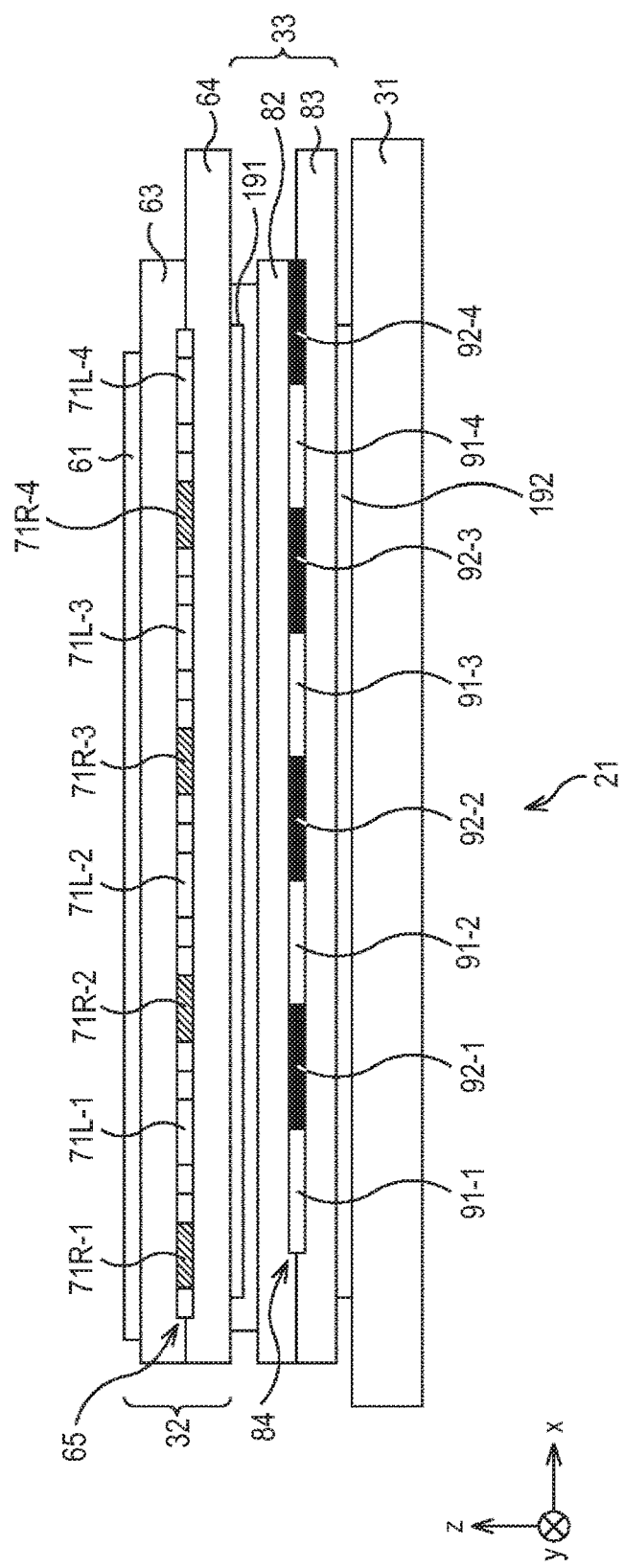

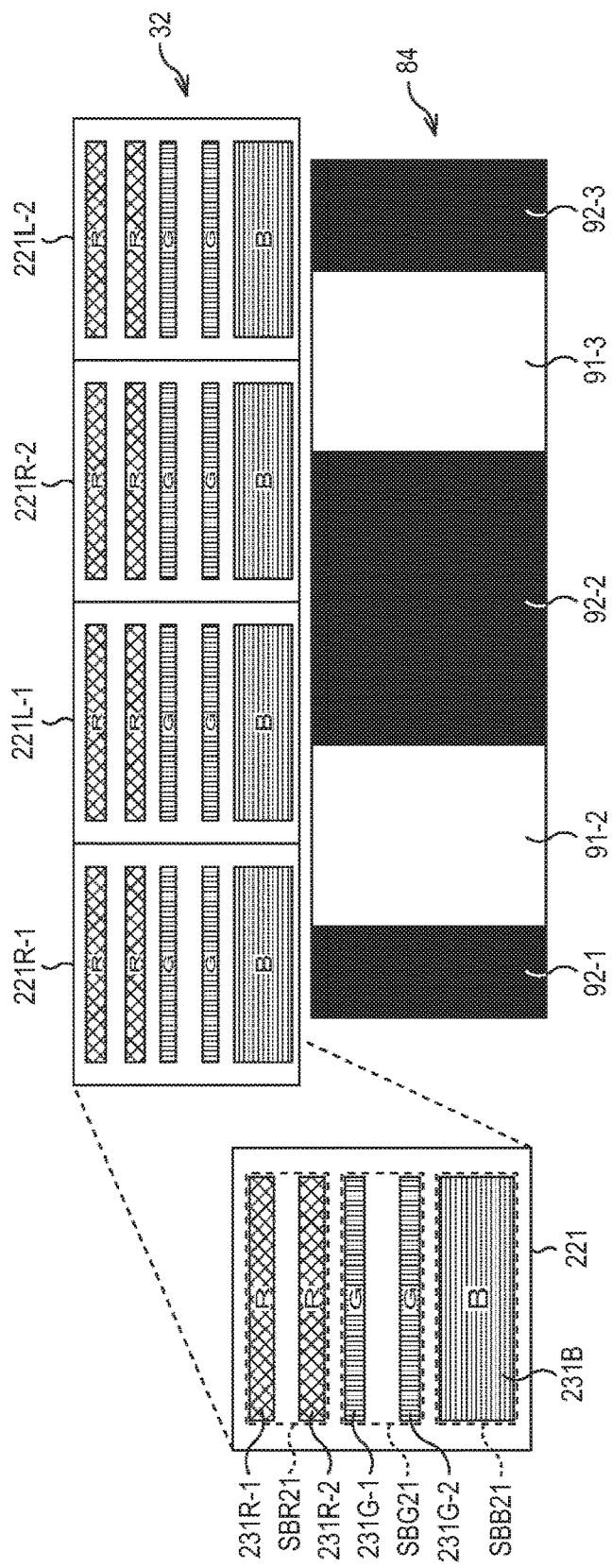

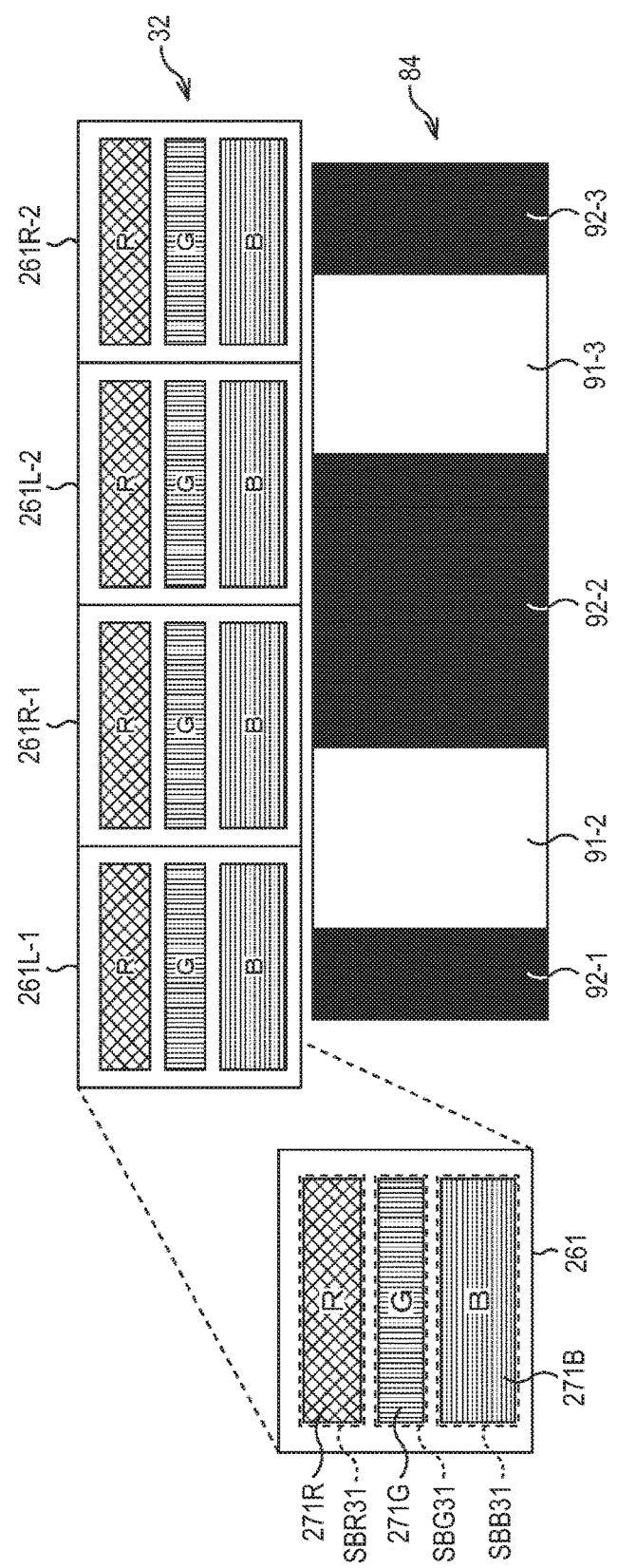

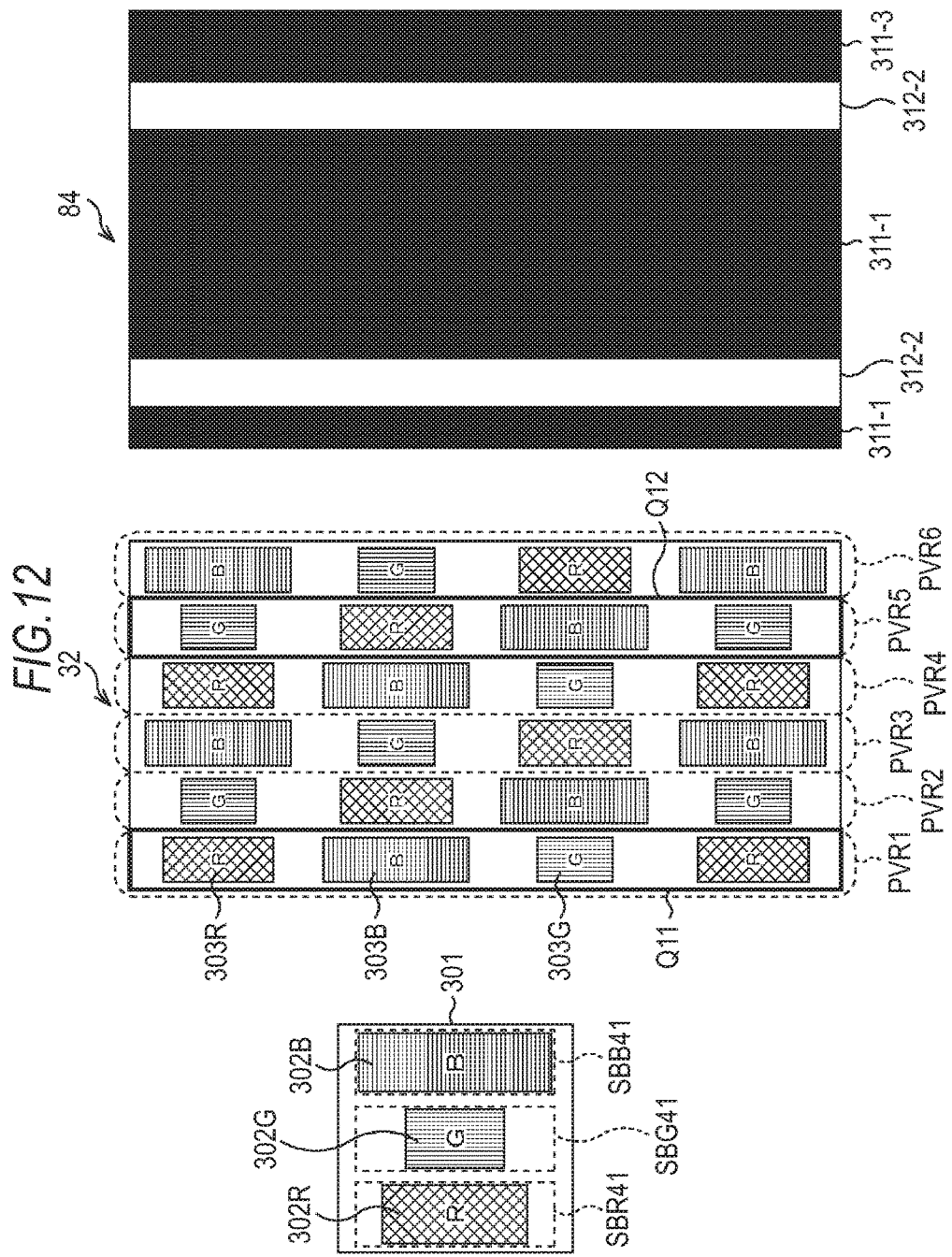

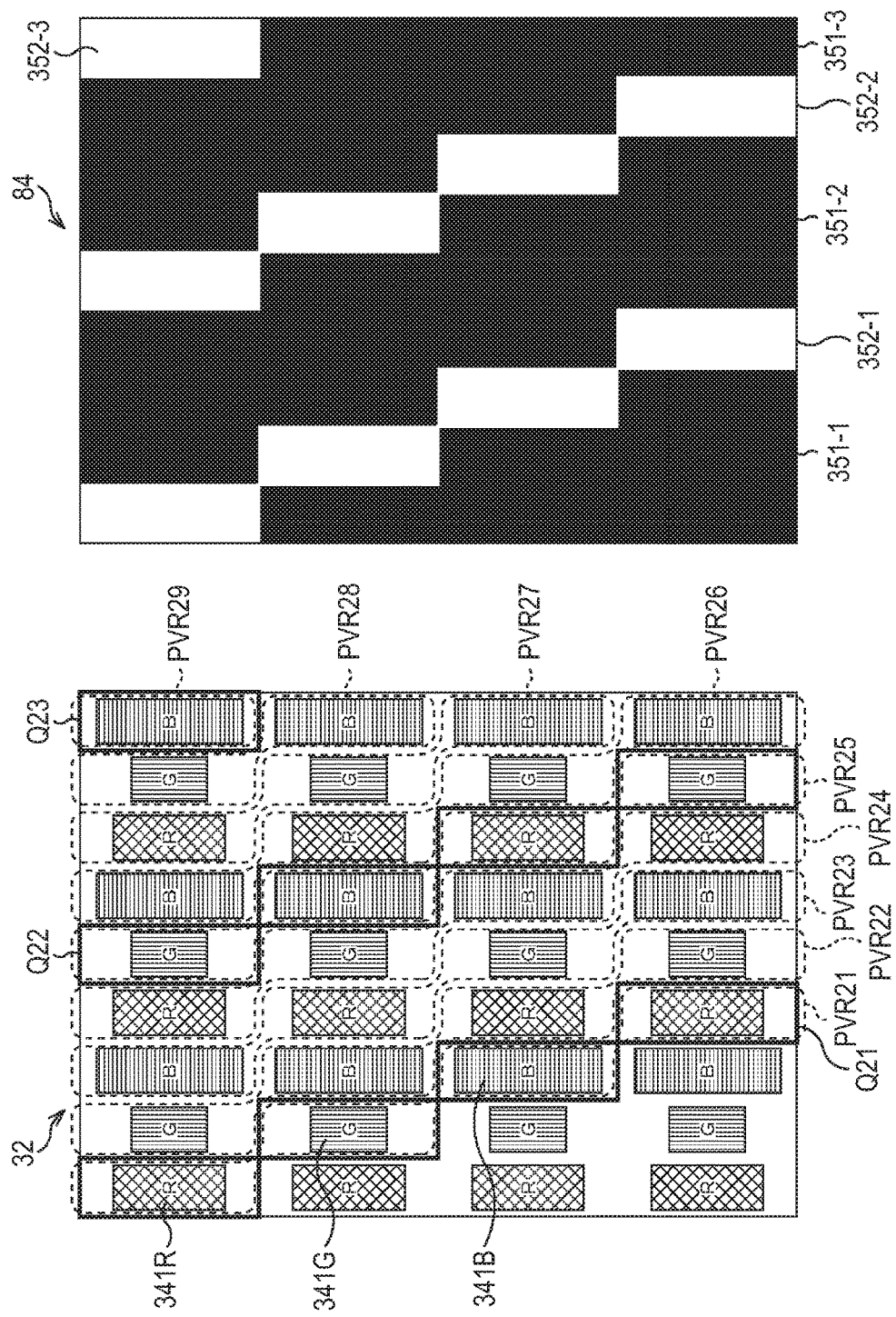

DISPLAY DEVICE

CROSS-REFERENCE TO RELATED APPLICATIONS

The present application is a Continuation of application Ser. No. 13/403,050, filed Feb. 23, 2012, and claims priority from Japanese Application No. 2011-056992, filed on Mar. 15, 2011, the contents of which are incorporated by reference herein in their entirety.

FIELD

The present disclosure relates to a display device and in particular, to a display device for displaying a stereoscopic image capable of obtaining the appropriate color balance more easily.

BACKGROUND

In the related art, display devices which display a stereoscopic image without the help of special glasses using a parallax barrier method, a lenticular lens method, and the like are known.

Among such display devices, there is a display device in which a parallax barrier is formed in the shape of a checkerboard and the width of two pixels is set as the horizontal width in order to prevent an imbalance of each color of R (red), G (green), and B (blue) of a stereoscopic image (for example, refer to JP-A-8-331605).

SUMMARY

In the technique described above, however, the amount of light of each color of R, G, and B which can be emitted from the display device, that is, the aperture ratio of each color, is the same. For example, it has been difficult to adjust the amount of light of each color separately in order to obtain the appropriate color balance (white balance).

It is therefore desirable to make it possible to obtain the appropriate color balance more easily in a display device which displays a stereoscopic image.

An embodiment of the present disclosure is directed to a display device including: a display unit in which pixels having first and second regions are arrayed in a matrix, the first region emitting first color light for displaying a stereoscopic image including images of a plurality of viewing points and the second region emitting second color light different from the first color light in order to display the stereoscopic image; and a separation unit that separates optically the images of the respective viewing points from each other so that the images of different viewing points are observed by the different eyes of a viewer. In a region on the display unit in which the image of a predetermined viewing point observed by the viewer is displayed, widths of the first and second regions in a parallax direction of the stereoscopic image are approximately the same and widths of the first and second regions in a vertical direction, which is approximately perpendicular to the parallax direction, are different.

The plurality of first regions may be provided in the pixels. In a region on the display unit in which the image of a predetermined viewing point observed by the viewer is displayed, a sum of the widths of the plurality of first regions within the pixels in the vertical direction may be set to be different from the width of the second region in the vertical direction.

In the display unit, wiring lines of the display unit may be provided along one edge, which is long in the parallax direction, of each of the plurality of first regions.

A third region which emits third color light, which is different from the first color light and the second color light, in order to display the stereoscopic image may be provided in the pixel. In a region on the display unit in which the image of a predetermined viewing point observed by the viewer is displayed, widths of the first to third regions in the parallax direction may be set to be approximately the same and widths of the first to third regions in the vertical direction may be set to be different.

The width of the first region in the vertical direction may be adjusted by a width of a light shielding section which blocks light and which is provided in a filter, through which the first color light is transmitted, on the pixel.

According to the embodiment of the present disclosure, the stereoscopic image is displayed on the display unit in which pixels having the first region, which emits first color light for displaying a stereoscopic image including images of a plurality of viewing points, and the second region, which emits second color light different from the first color light in order to display the stereoscopic image, are arrayed in a matrix. The images of the respective viewing points are optically separated so that the images of different viewing points are observed by the different eyes of the viewer. In addition, in a region on the display unit in which the image of a predetermined viewing point observed by the viewer is displayed, the widths of the first and second regions in the parallax direction of the stereoscopic image are set to be approximately the same and the widths of the first and second regions in the vertical direction, which is approximately perpendicular to the parallax direction, are set to be different.

Another embodiment of the present disclosure is directed to a display device including: a display unit in which pixels having first and second regions are arrayed in a matrix, the first region emitting first color light for displaying a viewing point image and the second region emitting second color light different from the first color light in order to display the viewing point image; and a separation unit that separates optically the plurality of viewing point images arrayed in a first direction. Widths of the first and second regions in the first direction of the display unit are approximately the same, and widths of the first and second regions in a second direction, which is different from the first direction, are different.

According to the embodiment of the present disclosure, the plurality of viewing point images are displayed on the display unit in which pixels having the first region, which emits first color light for displaying a viewing point image, and the second region, which emits second color light different from the first color light in order to display the viewing point image, are arrayed in a matrix. The plurality of viewing point images arrayed in the first direction are optically separated. Moreover, the widths of the first and second regions in the first direction of the display unit are set to be approximately the same, and the widths of the first and second regions in the second direction, which is different from the first direction, are set to be different.

According to the embodiments of the present disclosure, it is possible to obtain the appropriate color balance more easily in a display device which displays a stereoscopic image.

BRIEF DESCRIPTION OF THE DRAWINGS

FIG. 3 is a view showing an example of a stereoscopic image;

FIG. 6 is a view showing an example of the arrangement of color filters;

FIG. 7 is a view explaining how the light of each color spreads in the parallax direction;

FIG. 8 is a view showing the relative transmittance of each color at the viewing position;

FIG. 9 is a view showing an example of the configuration of a display unit;

FIG. 10 is a view showing an example of the arrangement of color filters;

FIG. 11 is a view showing an example of the arrangement of color filters;

FIG. 12 is a view showing an example of the arrangement of color filters; and

FIG. 13 is a view showing an example of the arrangement of color filters.

DETAILED DESCRIPTION

Hereinafter, embodiments of the present disclosure will be described with reference to the accompanying drawings.
<First Embodiment>
[Example of the Configuration of a Stereoscopic Image Display Device]

Figure 1:
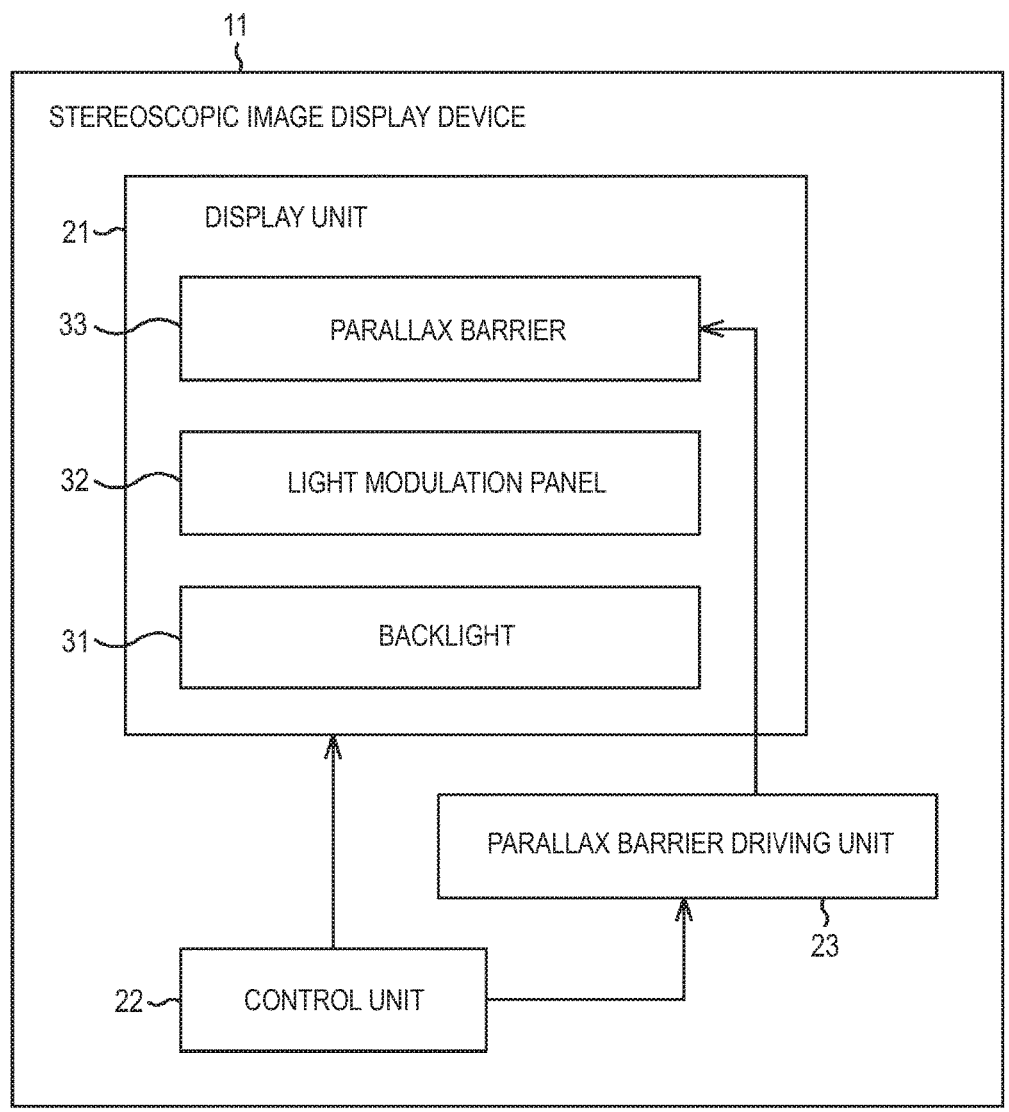
FIG. 1 is a view showing an example of the configuration of a stereoscopic image display device according to an embodiment.

FIG. 1 is a view showing an example of the configuration of a stereoscopic image display device according to an embodiment of the present disclosure.

A stereoscopic image display device 11 displays a stereoscopic image and a planar image while performing display switching between a three-dimensional stereoscopic image based on a parallax barrier method and a two-dimensional planar image according to necessity. The stereoscopic image display device 11 is configured to include a display unit 21, a control unit 22, and a parallax barrier driving unit 23.

The display unit 21 includes a backlight 31, a light modulation panel 32, and a parallax barrier 33, and displays a two-dimensional planar image or a three-dimensional stereoscopic image including an image for the right eye observed (perceived) by the right eye of a viewer and an image for the left eye observed by the left eye of the viewer.

That is, the backlight 31 is an illumination device for only an image display which includes a light guide plate, a light source such as an LED (Light Emitting Diode), and a reflecting sheet. The backlight 31 emits light for displaying an image so that the light is incident on the light modulation panel 32.

The light modulation panel 32 is a liquid crystal display panel including a color filter of each color of R, G, and B, a liquid crystal layer, a polarizing plate, and a thin film transistor. The light modulation panel 32 allows light incident from the backlight 31 to be transmitted therethrough in order to display an image. In this case, the light modulation panel 32 performs gray-scale display of each pixel of an image by changing the transmittance of light for each pixel provided in the light modulation panel 32.

The parallax barrier 33 includes a polarizing plate, a switch liquid crystal layer, and the like. At the time of display of a stereoscopic image, the parallax barrier 33 separates optically an image for the right eye from an image for the left eye by blocking some of light beams incident from the light modulation panel 32 and allowing the remaining light beams to be transmitted therethrough. In addition, the parallax barrier 33 allows light incident from the light modulation panel 32 to be transmitted therethrough as it is at the time of display of a planar image.

The control unit 22 controls each unit of the stereoscopic image display device 11, that is, the display unit 21 or the parallax barrier driving unit 23. For example, the control unit 22 drives a display driver (not shown) of the display unit 21 to display an image on the light modulation panel 32 or to emit light from the backlight 31.

The parallax barrier driving unit 23 drives the parallax barrier 33 according to the control of the control unit 22 to block some of light beams, which are incident on the parallax barrier 33 from the light modulation panel 32, so that an image for the right eye and an image for the left eye are separated from each other. More specifically, the parallax barrier driving unit 23 forms a slit region, through which light is transmitted, and a light shielding region, which is for blocking light, in the parallax barrier 33.

[Example of the Configuration of a Display Unit]

Figure 2:
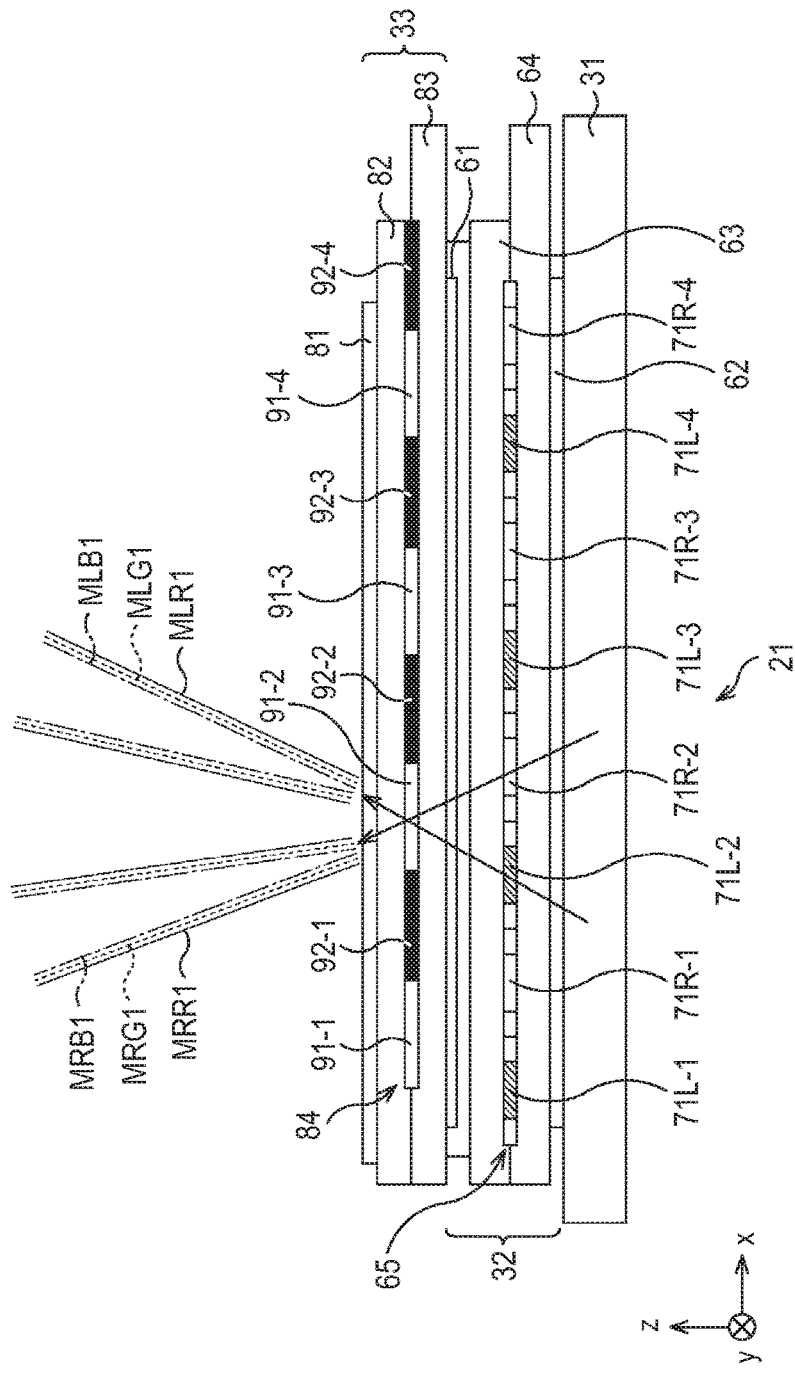
FIG. 2 is a view showing an example of the configuration of a display unit.

Next, the configuration of the display unit 21 shown in FIG. 1 will be described. FIG. 2 is a view showing an example of the more detailed configuration of the display unit 21. In addition, sections in FIG. 2 corresponding to the sections in FIG. 1 are denoted by the same reference numerals, and the explanation will be appropriately omitted. Moreover, in FIG. 2, the horizontal direction, the depth direction, and the vertical direction are assumed to be x, y, and z directions, respectively.

In FIG. 2, the light modulation panel 32 includes polarizing plates 61 and 62, a counter substrate 63, a TFT (Thin Film Transistor) substrate 64, and a liquid crystal layer 65.

That is, the plate-shaped counter substrate 63 and the plate-shaped TFT substrate 64 are provided so as to face each other between the polarizing plates 61 and 62 disposed so as to face each other. Then, the liquid crystal layer 65 is formed between the counter substrate 63 and the TFT substrate 64.

On a surface of the counter substrate 63 facing the liquid crystal layer 65, a color filter or a counter electrode is provided for each pixel. In particular, a color filter of each color of R, G, and B is provided in a region of each pixel of the counter substrate 63. In addition, on a surface of TFT substrate 64 facing the liquid crystal layer 65, a TFT (thin film transistor) which is a pixel electrode or a driving element is provided for each pixel.

Light transmissive sections 71L-1 to 71L-4, which allow light for displaying an image for the left eye to be transmitted therethrough at the time of display of a stereoscopic image, and light transmissive sections 71R-1 to 71R-4, which allow light for displaying an image for the right eye to be transmitted therethrough at the time of display of a stereoscopic image, are provided in the liquid crystal layer 65. In the light modulation panel 32, one light transmissive section is provided for each pixel arrayed in a matrix.

When a voltage is applied to the counter electrode of the counter substrate 63 and the pixel electrode of the TFT substrate 64 at the time of display of a stereoscopic image or a planar image, the orientation direction of liquid crystal molecules sealed in the light transmissive sections 71L-1 to 71R-4 changes according to the size of the voltage. As a result, since the transmittance of light incident on the light modulation panel 32 from the backlight 31 changes, the amount of light transmitted through each pixel becomes the amount of light corresponding to the pixel value of an image displayed on these pixels.

In addition, hereinafter, the light transmissive sections 71L-1 to 71L-4 are also simply called a light transmissive section 71L when it is not necessary to distinguish the light transmissive sections 71L-1 to 71L-4, and the light transmissive sections 71R-1 to 71R-4 are also simply called a light transmissive section 71R when it is not necessary to distinguish the light transmissive sections 71R-1 to 71R-4. In addition, the light transmissive sections 71L and 71R are also simply called a light transmissive section 71 hereinafter when it is not necessary to distinguish the light transmissive sections 71L and 71R in particular.

In the light modulation panel 32, the light transmissive sections 71L and 71R are alternately provided in the x direction on the xy plane, and the light transmissive sections 71L or 71R are arrayed continuously in the y direction.

Accordingly, at the time of display of a stereoscopic image, a rectangular region on an image for the left eye which forms the stereoscopic image and a rectangular region on an image for the right eye which forms the stereoscopic image are alternately arrayed in the x direction and displayed on the light modulation panel 32. In addition, light transmitted through one pixel, that is, one light transmissive section 71, becomes light which displays one pixel on an image.

Here, although the image for the left eye and the image for the right eye which form the stereoscopic image are images with parallax, the x direction in FIG. 2 is a direction of the parallax between the image for the left eye and the image for the right eye, that is, a direction in which the left and right eyes of the viewer are arrayed. The x direction is also called a parallax direction hereinbelow.

In addition, at the time of display of a two-dimensional planar image, each light transmissive section 71 makes light, which is for displaying a planar image and is incident from the backlight 31, transmitted therethrough and incident on the parallax barrier 33.

The parallax barrier 33 is configured to include the polarizing plates 61 and 81, transparent plates 82 and 83, and a switch liquid crystal layer 84. In FIG. 2, the polarizing plate 61 is used as both a member which forms the light modulation panel 32 and a member which forms the parallax barrier 33.

In the parallax barrier 33, the plate-shaped transparent plates 82 and 83 are provided so as to face each other between the polarizing plates 61 and 81 disposed so as to face each other. In addition, the switch liquid crystal layer 84 is formed between the transparent plates 82 and 83.

Electrodes are formed on surfaces of the transparent plates 82 and 83 facing the switch liquid crystal layer 84, and the orientation direction of liquid crystal molecules in the switch liquid crystal layer 84 changes when a voltage is applied to some or all of these electrodes. As a result, a parallax barrier is formed in the switch liquid crystal layer 84.

In the example shown in FIG. 2, a parallax barrier formed by slit regions 91-1 to 91-4, which allow light incident from the light modulation panel 32 to be transmitted therethrough, and light shielding regions 92-1 to 92-4, which block light incident from the light modulation panel 32, is formed in the switch liquid crystal layer 84.

In addition, hereinafter, the slit regions 91-1 to 91-4 are also simply called a slit region 91 when it is not necessary to distinguish the slit regions 91-1 to 91-4, and the light shielding regions 92-1 to 92-4 are also simply called a light shielding region 92 when it is not necessary to distinguish the light shielding regions 92-1 to 92-4.

In FIG. 2, the slit region 91 and the light shielding region 92, each of which has a rectangular shape that is long in the y direction, are alternately formed in the parallax direction (x direction) in the switch liquid crystal layer 84. That is, the striped parallax barrier is formed in the switch liquid crystal layer 84. Here, the region where the light shielding region 92 is formed is a region to which a voltage is applied by the electrode.

In the display unit 21, a voltage is applied to electrodes of the transparent plates 82 and 83 at the time of display of a stereoscopic image. Then, a parallax barrier shown in FIG. 2 is formed in the switch liquid crystal layer 84. In such a case, a light beam incident on the slit region 91, among light beams which are emitted from the light modulation panel 32 to become linearly polarized light beams by the polarizing plate 61, is transmitted as it is through the slit region 91 and the polarizing plate 81. On the other hand, a light beam incident on the light shielding region 92, among light beams which are emitted from the light modulation panel 32 to become linearly polarized light beams by the polarizing plate 61, is absorbed in the light shielding region 92 so as not to be emitted from the parallax barrier 33.

Moreover, in the display unit 21, a parallax barrier is not formed in the switch liquid crystal layer 84 at the time of display of a planar image since a voltage is not applied to the electrodes of the transparent plates 82 and 83. That is, the entire region of the switch liquid crystal layer 84 is the same as a slit region. In this case, all light beams incident from the light modulation panel 32 are transmitted through the parallax barrier 33 and are then incident on the left and right eyes of the viewer.

[Explanation Regarding an Operation of a Stereoscopic Image Display Device]

Next, an operation of the stereoscopic image display device 11 will be described. Moreover, as shown in FIG. 2, the viewer observes an image displayed on the stereoscopic image display device 11 from the position which is separated by a predetermined distance (for example, 30 cm) in the z direction from the surface of the parallax barrier 33 of the display unit 21. In addition, the distance between the right eye ER and the left eye EL of a general viewer is about 6.5 cm.

First, a case where a stereoscopic image is displayed will be described. In such a case, the control unit 22 applies a voltage to a counter electrode of the counter substrate 63 and a pixel electrode of the TFT substrate 64 for each pixel of the light modulation panel 32 on the basis of an image signal of a stereoscopic image. Then, the light transmissive section 71 which displays each pixel of the stereoscopic image allows light to be transmitted therethrough at the light transmission rate corresponding to the pixel values of these pixels.

In addition, the control unit 22 instructs the parallax barrier driving unit 23 to drive the parallax barrier 33, and the parallax barrier driving unit 23 drives the parallax barrier 33 in response to the instruction. That is, the parallax barrier driving unit 23 applies a voltage to electrodes of the transparent plates 82 and 83 so that the parallax barrier formed by the slit regions 91 and 92 is formed in the switch liquid crystal layer 84.

In addition, the control unit 22 makes light be emitted from the backlight 31. The light emitted from the backlight 31 is transmitted through the polarizing plate 62 and the TFT substrate 64 and is then incident on the light transmissive section 71. Then, the light incident on the light transmissive section 71 is transmitted through the light transmissive section 71 at the light transmission rate corresponding to the pixel value of each pixel of the stereoscopic image and is then incident on the eyes of the viewer through the counter substrate 63, the polarizing plate 61, the transparent plate 83, the slit region 91, the transparent plate 82, and the polarizing plate 81.

In this case, a light beam transmitted through the light transmissive section 71L for the left eye among light beams emitted from the backlight 31 is incident on the left eye EL of the viewer, and a light beam transmitted through the light transmissive section 71R for the right eye is incident on the right eye ER of the viewer. Then, the image for the left eye and the image for the right eye which form the stereoscopic image are perceived by the left eye EL and the right eye ER of the viewer. As a result, the image is perceived in a three-dimensional way by the viewer.

For example, light which is emitted from the backlight 31 and is then transmitted through the light transmissive section 71L-2 for the left eye is transmitted through the slit region 91-2 and is then incident on the left eye EL of the viewer. In addition, light which is emitted from the backlight 31 and is then transmitted through the light transmissive section 71R-2 for the right eye is transmitted through the slit region 91-2 and is then incident on the right eye ER of the viewer.

In addition, the light incident on the light shielding region 92 after being emitted from the backlight 31 and transmitted through the light transmissive section 71 is absorbed (blocked) by the light shielding region 92 so as not to be incident on the eyes of the viewer. That is, these light beams are blocked by the parallax barrier.

Moreover, in the display unit 21, light beams of respective colors of R, G, and B transmitted through each light transmissive section 71 spread with approximately the same width on the xz plane in FIG. 2 and are then incident on the left eye EL and the right eye ER of the viewer.

For example, in FIG. 2, light beams of respective colors of R, G, and B transmitted through the light transmissive section 71L-2 and light beams of respective colors of R, G, and B transmitted through the light transmissive section 71R-2 spread with approximately the same width on the xz plane and are then incident on the left eye EL and the right eye ER of the viewer.

In FIG. 2, MLR1, MLG1, and MLB1 indicate light of R color, light of G color, and light of B color transmitted through the light transmissive section 71L-2, respectively. These light beams spread with approximately the same width and are then incident on the left eye EL of the viewer. Moreover, in FIG. 2, MRR1, MRG1, and MRB1 indicate light of R color, light of G color, and light of B color transmitted through the light transmissive section 71R-2, respectively. These light beams spread with approximately the same width and are then incident on the right eye ER of the viewer.

Accordingly, even if the viewing position (left eye EL and right eye ER) of the viewer moves in the parallax direction, the light amount ratio of light beams of the respective colors of R, G, and B incident on the eyes of the viewer becomes approximately fixed at each position in the parallax direction. As a result, it is possible to suppress a color imbalance of a stereoscopic image. In addition, adjustment of the color balance (white balance) of the stereoscopic image in the display unit 21 will be described later.

When displaying a stereoscopic image, as shown in FIG. 3, a stereoscopic image PD is generated from an image PR for the right eye and an image PL for the left eye with parallax and this stereoscopic image PD is displayed on the light modulation panel 32. In addition, in FIG. 3, the horizontal and vertical directions are directions corresponding to the x direction (parallax direction) and the y direction, respectively.

The stereoscopic image PD is an image obtained by dividing each of the images PR and PL into striped rectangular regions, which are long in the y direction, and arraying alternately in the x direction the rectangular regions obtained from the image PR and the rectangular regions obtained from the image PL, for example. Thus, when the stereoscopic image PD formed by the images PR and PL is displayed on the light modulation panel 32, the image PL for the left eye which forms the stereoscopic image PD is displayed on a pixel having the light transmissive section 71L and the image PR for the right eye which forms the stereoscopic image PD is displayed on a pixel having the light transmissive section 71R.

Next, a case of displaying a two-dimensional planar image on the stereoscopic image display device 11 will be described. In this case, the control unit 22 applies a voltage to the pixel electrode or the like on the basis of an image signal of the planar image for each pixel of the light modulation panel 32, so that the transmittance of the light transmissive section 71 is set to the transmittance corresponding to the pixel values of these pixels.

In addition, the control unit 22 controls the parallax barrier driving unit 23 such that a voltage is not applied to the electrode of the parallax barrier 33 and a parallax barrier is not formed accordingly, and also controls the display unit 21 to make light emitted from the backlight 31.

The light emitted from the backlight 31 is transmitted through the light modulation panel 32 and the parallax barrier 33 and is then incident on the left and right eyes of the viewer. That is, each pixel of the planar image is displayed on each pixel provided in the light transmissive section 71 of the light modulation panel 32.

[Regarding the Arrangement of Filter Regions]

Figure 4:
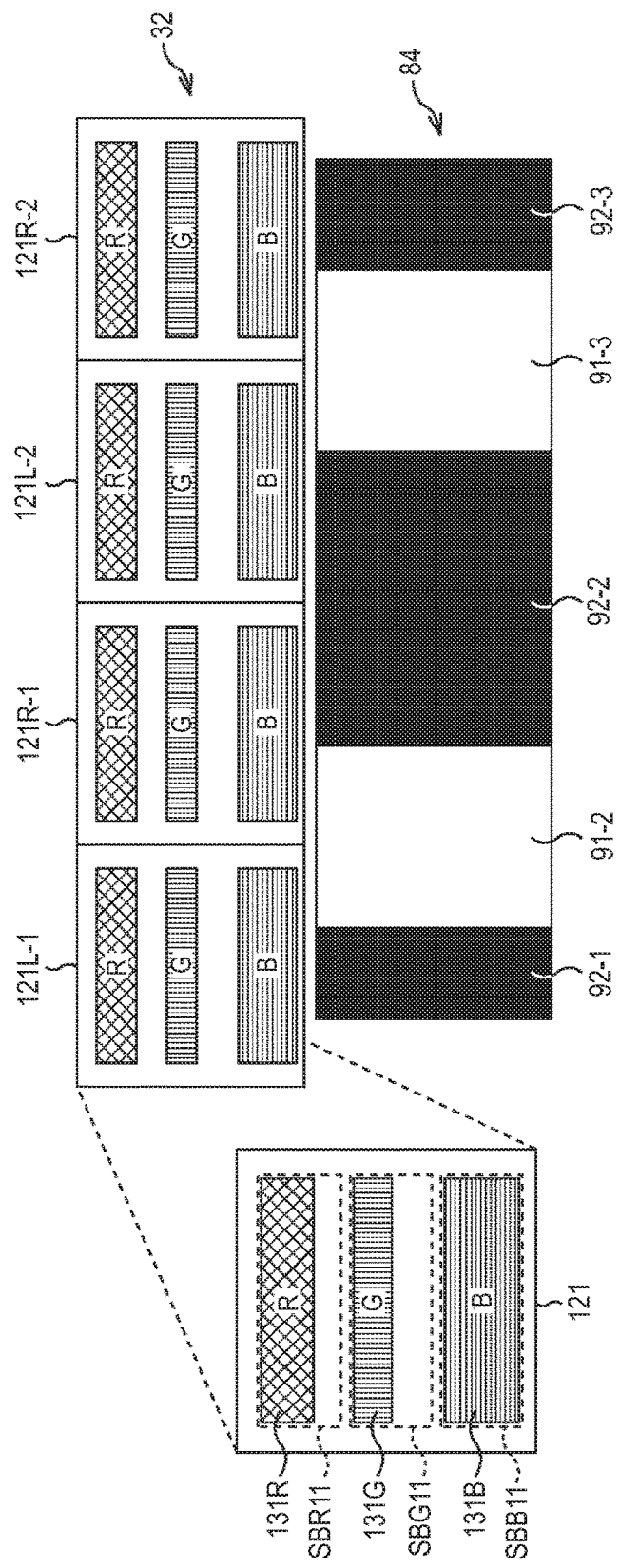
FIG. 4 is a view showing an example of the arrangement of color filters.

Meanwhile, a color filter which makes only a component of each color of R, G, and B, among light beams incident from the backlight 31, transmitted therethrough and incident on the parallax barrier 33 is provided in each pixel of the light modulation panel 32 as shown in FIG. 4, for example. In addition, sections in FIG. 4 corresponding to the sections in FIG. 2 are denoted by the same reference numerals, and the explanation will be appropriately omitted.

In addition, parts of the light modulation panel 32 and the switch liquid crystal layer 84 are shown in FIG. 4. In FIG. 4, the horizontal direction, the vertical direction, and the depth direction indicate x, y, and z directions, respectively. Moreover, in FIG. 4, the switch liquid crystal layer 84 is shown in a state shifted downward from the light modulation panel 32 in the drawing, for the sake of explanation.

In the example shown in FIG. 4, pixels 121R-1 and 121R-2 on which an image for the right eye is displayed at the time of display of a stereoscopic image and pixels 121L-1 and 121L-2 on which an image for the left eye is displayed at the time of display of a stereoscopic image are provided in the light modulation panel 32.

In addition, hereinafter, the pixels 121R-1 and 121R-2 are simply called a pixel 121R when it is not necessary to distinguish the pixels 121R-1 and 121R-2 in particular, and the pixels 121L-1 and 121L-2 are simply called a pixel 121L when it is not necessary to distinguish the pixels 121L-1 and 121L-2 in particular. In addition, the pixels 121R and 121L are simply called a pixel 121 hereinafter when it is not necessary to distinguish the pixels 121R and 121L in particular.

Each pixel 121 provided in the light modulation panel 32 includes a color filter, the light transmissive section 71, and the like, and is also a region where each pixel of a stereoscopic image is displayed. In the light modulation panel 32, the pixels 121R and 121L are arrayed alternately in the x direction.

For example, the pixel 121R has one light transmissive section 71R, and light transmitted through the light transmissive section 71R is transmitted through a color filter of each color of the pixel 121R and is then incident on the parallax barrier 33. Specifically, the pixel 121R-1 has a light transmissive section 71R-3, for example. Similarly, the pixel 121L has one light transmissive section 71L, and light transmitted through the light transmissive section 71L is transmitted through a color filter of each color of the pixel 121L and is then incident on the parallax barrier 33.

Moreover, in FIG. 4, the region of a color filter through which only the light of R color is transmitted, among color filters provided in each pixel 121, is a region which is shaded by oblique lines and in which the letter "R" is written. In addition, among the color filters provided in each pixel 121, the region of a color filter through which only the light of G color is transmitted is a region which is shaded by vertical lines and in which the letter "G" is written, and the region of a color filter through which only the light of B color is transmitted is a region which is shaded by horizontal lines and in which the letter "B" is written.

More specifically, sub-pixels SBR11, SBG11, and SBB11 having a color filter of each color are provided in the pixel 121, as shown at the left side in FIG. 4, for example. Although each color filter is provided on the surface (hereinafter, referred to as a filter surface) of the counter substrate 63, which forms the pixel 121, facing the liquid crystal layer 65, a region other than the sub-pixels SBR11 to SBB11 on this filter surface is a light shielding region for blocking light.

In addition, in the pixel 121, a filter region 131R of an R color filter through which only the light of R color is transmitted and a light shielding region which blocks light are provided in the sub-pixel SBR11. In the sub-pixel SBR11, a region other than the filter region 131R on the filter surface is a light shielding region. This light shielding region is formed by covering a part of the R color filter, which serves as the filter region 131R and has the same size as the sub-pixel SBR11, with a light shielding member.

Similarly, in the pixel 121, a filter region 131G of a G color filter through which only the light of G color is transmitted and a light shielding region which blocks light are provided in the sub-pixel SBG11. Also in the sub-pixel SBG11, a light shielding region is formed by covering a part of the G color filter with a light shielding member, and a region other than the filter region 131G in the sub-pixel SBG11 is a light shielding region.

In addition, in the pixel 121, a filter region 131B of a B color filter through which only the light of B color is transmitted is provided in the sub-pixel SBB11. Since a light shielding region is not provided in the sub-pixel SBB11, the entire region of the sub-pixel SBB11 becomes the filter region 131B. In addition, the filter regions 131R to 131B are also simply called a filter region 131 hereinafter when it is not necessary to distinguish the filter regions 131R to 131B in particular.

Thus, the filter regions 131R to 131B through which light beams of respective colors of R, G, and B among light beams incident from the backlight 31 are transmitted are provided in each pixel 121. Then, some light beams of respective colors transmitted through these filter regions 131 are incident on the eyes of the viewer through the slit region 91, and the stereoscopic image is perceived by the viewer.

In order to appropriately correct the balance of colors of a stereoscopic image perceived by the viewer, that is, the white balance in displaying the stereoscopic image, it is necessary to adjust the amount of light of each color incident on the eyes of the viewer to an appropriate amount.

Therefore, in each pixel 121, the amount of transmitted light of each color is adjusted by making the length of the filter region 131 of each color of R, G, and B in the x direction (parallax direction) approximately equal and making different the length of the filter region 131 of each color in the y direction perpendicular to the x direction. That is, balance adjustment of each color is performed by adjusting the area (aperture ratio of a color filter of each color) of the filter region 131 of each color. Through such color balance adjustment, it becomes possible to observe a stereoscopic image with the more appropriate color balance.

In particular, in the example shown in FIG. 4, the y-direction length of a light shielding member provided on the color filter of each color is adjusted so that the length of the filter region 131 in the y direction is adjusted to realize the appropriate color balance.

In addition, in the display unit 21, the length of the filter region 131 of each color in the parallax direction is approximately the same. For this reason, even if the viewing point of the viewer is shifted in the parallax direction, the length of the filter region 131 in the parallax direction necessarily becomes approximately the same length in a visible region where an image for the left eye or the right eye observed by the viewer on the light modulation panel 32 is displayed.

In addition, the visible region is a region, in which an image perceived by one eye of the viewer is displayed without being blocked by the parallax barrier, of the region where an image for the left eye or the right eye on the filter surface is displayed. In other words, assuming that all light beams from the backlight 31 are transmitted through the filter surface, a region on the filter surface, through which light incident on one of the eyes of the viewer through the slit region 91 among light beams from the backlight 31 is transmitted, is the visible region.

Figure 5:
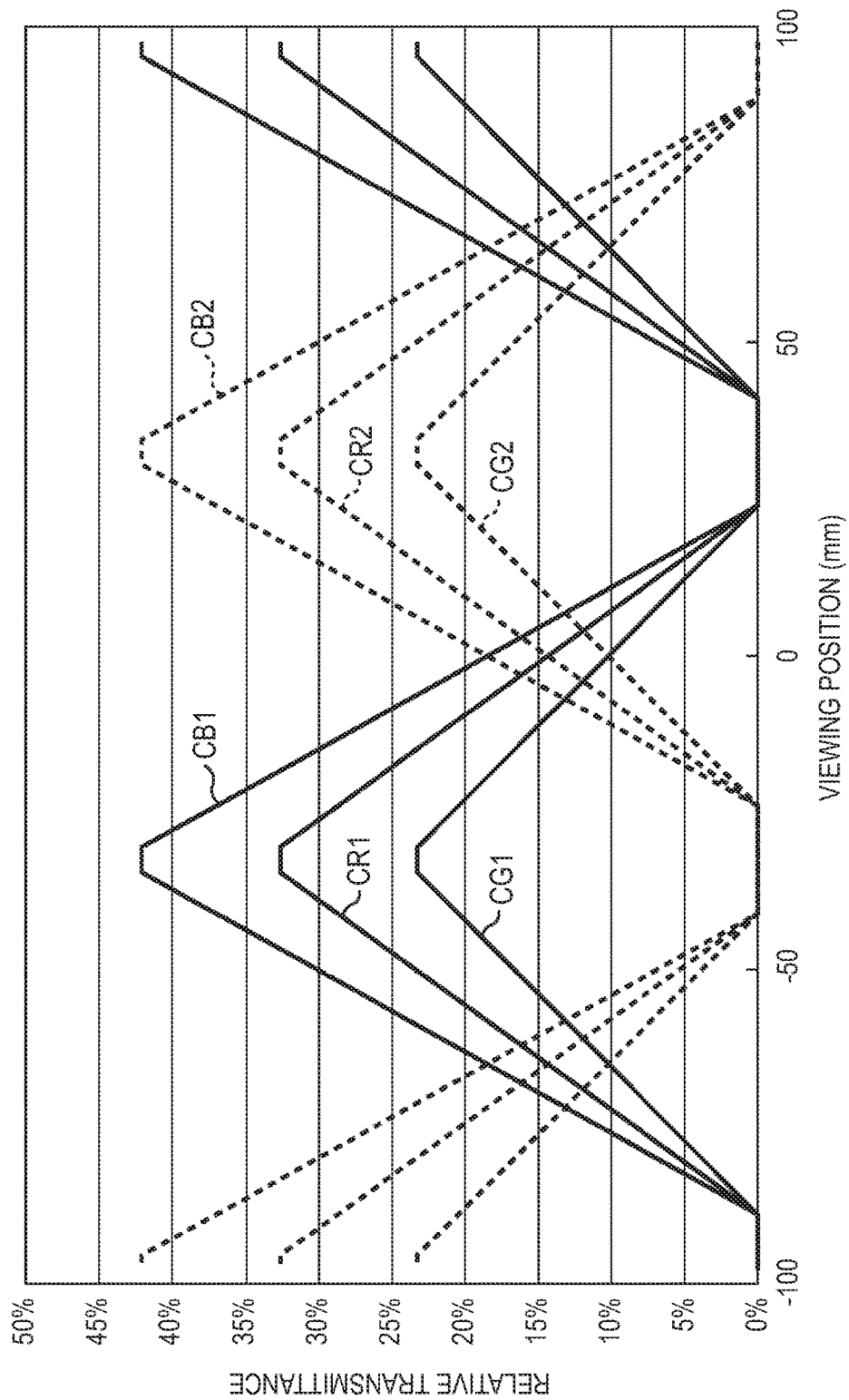
FIG. 5 is a view showing the relative transmittance of each color at the viewing position.

Accordingly, for example, as shown in FIG. 5, the ratio of the amount of light of each color of R, G, and B incident on the eyes of the viewer becomes approximately fixed regardless of the viewing position of the viewer. Moreover, in FIG. 5, the horizontal direction indicates a viewing position of the viewer in the x direction, and the vertical axis indicates the relative transmittance of light of each color of R, G, and B, that is, the amount of light incident on the eyes of the viewer.

In FIG. 5, polygonal lines CR1, CG1, and CB1 show the amount of light which is transmitted through the filter regions 131R, 131G, and 131B of the pixel 121R and then reaches the viewing position, respectively. In addition, polygonal lines CR2, CG2, and CB2 show the amount of light which is transmitted through the filter regions 131R, 131G, and 131B of the pixel 121L and then reaches the viewing position, respectively.

In the polygonal lines CR1, CG1, and CB1, center positions of their peaks are the same position in the x direction. Accordingly, the ratio of the amount of light (relative transmittance) becomes approximately fixed at each viewing position. Similarly, also in the polygonal lines CR2, CG2, and CB2, center positions of their peaks are the same position in the x direction. Accordingly, the ratio of the amount of light becomes approximately fixed at each viewing position.

Therefore, if the width of each filter region 131 in the y direction is appropriately adjusted in a state where the width of each filter region 131 in the x direction in the pixel 121 is set to be approximately the same, it is possible to obtain the appropriate color balance more easily. In addition, since the ratio of the amount of light of each color incident on the eyes of the viewer can be made to be approximately fixed regardless of the viewing position of the viewer, it is possible to suppress a color imbalance according to the observation position of a stereoscopic image.

Meanwhile, when adjusting the size (aperture ratio) of the filter region of each pixel of the light modulation panel 32, it is also possible to consider a method of adjusting the amount of light of each color by changing the width of each filter region in the x direction in a state where the width of each filter region in the y direction is set to be the same, as shown in FIG. 6, for example.

In addition, sections in FIG. 6 corresponding to the sections in FIG. 2 are denoted by the same reference numerals, and the explanation will be appropriately omitted.

In addition, parts of the light modulation panel 32 and the switch liquid crystal layer 84 are shown in FIG. 6. In FIG. 6, the horizontal direction, the vertical direction, and the depth direction indicate x, y, and z directions, respectively. Moreover, in FIG. 6, the switch liquid crystal layer 84 is shown in a state shifted downward from the light modulation panel 32 in the drawing, for the sake of explanation.

In the example shown in FIG. 6, pixels 161R-1 and 161R-2 on which an image for the right eye is displayed at the time of display of a stereoscopic image and pixels 161L-1 and 161L-2 on which an image for the left eye is displayed at the time of display of a stereoscopic image are provided in the light modulation panel 32. In addition, the pixels 161R-1 to 161L-2 are also simply called a pixel 161 hereinafter when it is not necessary to distinguish the pixels 161R-1 to 161L-2 in particular.

A filter region of a color filter which allows only the light of each color of R, G, and B to be transmitted therethrough is provided in each pixel 161. Here, in the pixel 161, the filter region through which only the light of R color is transmitted is a region which is shaded by oblique lines and in which the letter "R" is written. In addition, the filter region through which only the light of G color is transmitted is a region which is shaded by vertical lines and in which the letter "G" is written, and the filter region through which only the light of B color is transmitted is a region which is shaded by horizontal lines and in which the letter "B" is written.

In this example, the y-direction width of the filter region of each color of R, G, and B is approximately the same, but the width in the x direction differs according to each color. That is, the color balance is adjusted by the width of each filter region in the x direction. Specifically, among the x-direction widths of the filter region of respective colors of R, G, and B, the width of the filter region of the B color is largest and the width of the filter region of the G color is smallest.

In such a case, light beams of the respective colors emitted from the display unit 21 spread with different widths and reach the viewing position of the viewer, as shown in FIG. 7. In addition, sections in FIG. 7 corresponding to the sections in FIG. 2 are denoted by the same reference numerals, and the explanation will be appropriately omitted. Moreover, in FIG. 7, the horizontal direction, the depth direction, and the vertical direction are assumed to be x, y, and z directions, respectively.

In FIG. 7, light beams of respective colors of R, G, and B transmitted through the light transmissive section 71L-2 and light beams of respective colors of R, G, and B transmitted through the light transmissive section 71R-2 spread with different widths on the xz plane and are then incident on the left eye EL and the right eye ER of the viewer.

Here, MLR11, MLG11, and MLB11 indicate light of R color, light of G color, and light of B color transmitted through the light transmissive section 71L-2, respectively. These light beams spread with different widths and are then incident on the left eye EL of the viewer. That is, the light of B color spreads largest, and the light of G color spreads smallest. The relationship of the spread widths of light beams of respective colors is the same as the relationship of the x-direction widths of the filter region of respective colors in the pixel 161 shown in FIG. 6.

In addition, MRR11, MRG11, and MRB11 indicate light of R color, light of G color, and light of B color transmitted through the light transmissive section 71R-2, respectively. These light beams spread with different widths and are then incident on the right eye ER of the viewer.

Accordingly, for example, if the viewing position of the viewer moves in the x direction (parallax direction) as shown in FIG. 8, the ratio of the amount of light of each color of R, G, and B incident on the eyes of the viewer changes. Moreover, in FIG. 8, the horizontal direction indicates a viewing position of the viewer in the x direction, and the vertical axis indicates the relative transmittance (amount of light) of light of each color of R, G, and B.

In FIG. 8, polygonal lines CR11, CG11, and CB11 show the amount of light which is transmitted through the filter region of each color of R, G, and B of the pixel 161, which displays an image for the right eye, and then reaches a viewing position. In addition, polygonal lines CR12, CG12, and CB12 show the amount of light which is transmitted through the filter region of each color of R, G, and B of the pixel 161, which displays an image for the left eye, and then reaches a viewing position.

In the polygonal lines CR11, CG11, and CB11, center positions of their peaks are different positions in the x direction. Accordingly, the ratio of the amount of light (relative transmittance) of each color differs with a viewing position. Similarly, also in the polygonal lines CR12, CG12, and CB12, center positions of their peaks are different positions in the x direction. Accordingly, the ratio of the amount of light is different at each viewing position. This is because each of the center positions of the filter regions of respective colors of R, G, and B in FIG. 6 is slightly shifted in the x direction.

For this reason, since the color balance changes according to the viewing position of the viewer, the stereoscopic image is colored depending on the viewing position. Accordingly, when adjusting the color balance according to the aperture ratio of the filter region of each color, the method of adjusting the color balance according to the width of the filter region in the y direction shown in FIG. 4 is more suitable than the method of adjusting the color balance according to the width of the filter region in the x direction shown in FIG. 6.

As described above, by setting the x-direction width of each filter region 131 of the pixel 121 to be approximately the same and setting the x-direction position of the center of each filter region 131 to be approximately the same position and appropriately adjusting the y-direction width of each filter region 131, it is possible to obtain the appropriate color balance more easily and suppress a color imbalance of a stereoscopic image according to the viewing position. As a result, in the stereoscopic image display device 11, it is possible to maintain the appropriate color balance both when displaying a three-dimensional stereoscopic image and when displaying a two-dimensional planar image.

<Second Embodiment>

[Example of the Configuration of a Display Unit]

In the above explanation, in the display unit 21, light from the backlight 31 is incident on the parallax barrier 33 through the light modulation panel 32. However, the positional relationship between the light modulation panel 32 and the parallax barrier 33 may be reversed. That is, light from the backlight 31 may be incident on the parallax barrier 33 and light emitted from the parallax barrier 33 may be incident on the light modulation panel 32.

In such a case, the display unit 21 is formed as shown in FIG. 9, for example. In addition, sections in FIG. 9 corresponding to the sections in FIG. 2 are denoted by the same reference numerals, and the explanation will be appropriately omitted. Moreover, in FIG. 9, the horizontal direction, the depth direction, and the vertical direction are assumed to be x, y, and z directions, respectively.

The display unit 21 shown in FIG. 9 is configured to include the backlight 31, the light modulation panel 32, and the parallax barrier 33. The parallax barrier 33 is disposed between the light modulation panel 32 and the backlight 31.

The parallax barrier 33 includes polarizing plates 191 and 192, transparent plates 82 and 83, and a switch liquid crystal layer 84. Between the polarizing plates 191 and 192 disposed so as to face each other, the transparent plates 82 and 83 are provided so as to face each other.

In addition, the light modulation panel 32 includes the polarizing plates 61 and 191, the counter substrate 63, the TFT substrate 64, and the liquid crystal layer 65. That is, the counter substrate 63 and the TFT substrate 64 are provided so as to face each other between the polarizing plates 61 and 191 disposed so as to face each other, and the liquid crystal layer 65 is formed between the counter substrate 63 and the TFT substrate 64.

Moreover, in FIG. 9, the polarizing plate 191 is used as both a member which forms the light modulation panel 32 and a member which forms the parallax barrier 33. In addition, in FIG. 9, the arrangement of the light transmissive sections 71L and 71R is opposite to the positional relationship in the case shown in FIG. 2. That is, the light transmissive section 71L-1 is disposed at the right side of the light transmissive section 71R-1 in FIG. 9, for example.

When an image is displayed on the display unit 21, light emitted from the backlight 31 is incident on the light modulation panel 32 through the parallax barrier 33. By this light, an image is displayed on the light modulation panel 32. That is, light which is incident from the parallax barrier 33 and is then transmitted through the light modulation panel 32 is incident on the eyes of the viewer so that the image is perceived.

[Regarding the Arrangement of Filter Regions]

In addition, as shown in FIG. 10, a color filter which makes only a component of each color of R, G, and B, among light beams incident from the slit region 91 of the parallax barrier 33, is provided in each pixel of the light modulation panel 32 shown in FIG. 9, for example. In addition, sections in FIG. 10 corresponding to the sections in FIG. 9 are denoted by the same reference numerals, and the explanation will be appropriately omitted.

In addition, parts of the light modulation panel 32 and the switch liquid crystal layer 84 are shown in FIG. 10. In FIG. 10, the horizontal direction, the vertical direction, and the depth direction indicate x, y, and z directions, respectively. Moreover, in FIG. 10, the switch liquid crystal layer 84 is shown in a state shifted downward from the light modulation panel 32 in the drawing, for the sake of explanation.

In the example shown in FIG. 10, pixels 221R-1 and 221R-2 on which an image for the right eye is displayed at the time of display of a stereoscopic image and pixels 221L-1 and 221L-2 on which an image for the left eye is displayed at the time of display of a stereoscopic image are provided in the light modulation panel 32.

In addition, hereinafter, the pixels 221R-1 and 221R-2 are simply called a pixel 221R when it is not necessary to distinguish the pixels 221R-1 and 221R-2 in particular, and the pixels 221L-1 and 221L-2 are simply called a pixel 221L when it is not necessary to distinguish the pixels 221L-1 and 221L-2 in particular. In addition, the pixels 221R and 221L are simply called a pixel 221 hereinafter when it is not necessary to distinguish the pixels 221R and 221L in particular.

Each pixel 221 provided in the light modulation panel 32 includes a color filter, the light transmissive section 71, and the like, and is also a region where each pixel of a stereoscopic image is displayed. In the light modulation panel 32, the pixels 221R and 221L are arrayed alternately in the x direction.

For example, the pixel 221R has one light transmissive section 71R, and light transmitted through the light transmissive section 71R is transmitted through a color filter of each color of the pixel 221R and is then emitted from the display unit 21.

Moreover, in FIG. 10, the region of a color filter through which only the light of R color is transmitted, among color filters provided in each pixel 221, is a region which is shaded by oblique lines and in which the letter "R" is written. In addition, among the color filters provided in each pixel 221, the region of a color filter through which only the light of G color is transmitted is a region which is shaded by vertical lines and in which the letter "G" is written, and the region of a color filter through which only the light of B color is transmitted is a region which is shaded by horizontal lines and in which the letter "B" is written.

More specifically, sub-pixels SBR21, SBG21, and SBB21 having a color filter of each color are provided in the pixel 221, as shown at the left side in FIG. 10, for example. Although each color filter is provided on the filter surface of the counter substrate 63, which forms the pixel 221, facing the liquid crystal layer 65, a region other than the sub-pixels SBR21 to SBB21 on this filter surface is a light shielding region for blocking light.

In addition, the widths of the sub-pixels SBR21 to SBB21 in the y direction are approximately the same. In addition, in the pixel 221, filter regions 231R-1 and 231R-2 of an R color filter and a light shielding region which blocks light are provided in the sub-pixel SBR21.

In the sub-pixel SBR21, a region other than the filter regions 231R-1 and 231R-2 on the filter surface is a light shielding region. This light shielding region is formed by covering the approximate middle of the R color filter with a light shielding member. Moreover, in the R color filter, in a region in FIG. 10, which is not shielded by the light shielding member, a region above the light shielding region is set as the filter region 231R-1, and a region below the light shielding region is set as the filter region 231R-2.

Similarly, in the pixel 221, filter regions 231G-1 and 231G-2 of a G color filter and a light shielding region which blocks light are provided in the sub-pixel SBG21. Also in the sub-pixel SBG21, the light shielding region is formed by covering a portion, which is located approximately in the middle of the G color filter, with a light shielding member.

In addition, the filter regions 231R-1 and 231R-2 are also simply called a filter region 231R hereinafter when it is not necessary to distinguish the filter regions 231R-1 and 231R-2 in particular. In addition, the filter regions 231G-1 and 231G-2 are also simply called a filter region 231G hereinafter when it is not necessary to distinguish the filter regions 231G-1 and 231G-2 in particular.

In addition, in the pixel 221, a filter region 231B of a B color filter is provided in the sub-pixel SBB21. Since a light shielding region is not provided in the sub-pixel SBB21, the entire region of the sub-pixel SBB21 becomes the filter region 231B. In addition, the filter regions 231R to 231B are also simply called a filter region 231 hereinafter when it is not necessary to distinguish the filter regions 231R to 231B in particular.

Thus, the filter region 231 through which light beams of respective colors of R, G, and B, among light beams incident from the parallax barrier 33, are transmitted is provided in each pixel 221. Then, the light beams of respective colors transmitted through these filter regions 231 are incident on the eyes of the viewer, and the stereoscopic image is perceived by the viewer.

In each pixel 221, the amount of transmitted light of each color is adjusted by making the length of the filter region 231 of each color of R, G, and B in the x direction (parallax direction) approximately equal and making different the length of the filter region 231 of each color in the y direction.

That is, adjustment of the color balance is performed by the ratio of the total value of the y-direction widths of the filter regions 231R-1 and 231R-2, the total value of the y-direction widths of the filter regions 231G-1 and 231G-2, and the y-direction width of the filter region 231B. By such color balance adjustment, the appropriate color balance can be obtained more easily.

Here, the reason why the shielding region is formed in the approximately middle region of the sub-pixels SBR21 and SBG21 is to suppress a change in the aperture ratio of the filter region 231 when the color filter arrangement changes.

That is, in the light modulation panel 32, wiring lines of the light modulation panel 32, such as gate lines of TFTs, are provided between the filter regions 231R-2 and 231G-1 (in a boundary portion) along the edges, which are long in the x direction, of the filter regions 231R-2 and 231G-1. Similarly, also between the filter regions 231G-2 and 231B, wiring lines of the light modulation panel 32 are provided along the edges, which are long in the x direction, of the filter regions 231G-2 and 231B-1.

When a wiring line of the light modulation panel 32, such as a gate line or a signal line, overlaps the filter region 231 on the xy plane, light from the backlight 31 is blocked by the wiring line. As a result, the aperture ratio of the filter region 231 is reduced.

In the example shown in FIG. 10, however, when the sub-pixel SBG21 is observed, wiring lines of the light modulation panel 32 are disposed along the upper edge of the filter region 231G-1 in the drawing and the lower edge of the filter region 231G-2 in the drawing. More specifically, wiring lines of the light modulation panel 32 are disposed so as to overlap the filter region 231G slightly.

Accordingly, for example, if the sub-pixel SBG21 is disposed so as to be shifted downward from the wiring line, the aperture ratio of the filter region 231G-2 is reduced as much as the shift. In the filter region 231G-1, however, the aperture ratio is increased as much as the shift of the arrangement. Accordingly, even if the arrangement position of the sub-pixel SBG21 is slightly shifted from wiring lines of the light modulation panel 32, the total aperture ratio of the filter region 231G is approximately fixed. As a result, it is possible to maintain the appropriate color balance.

As described above, also in the pixel 221, the length of the filter region 231 of each color in the parallax direction is approximately the same. For this reason, even if the viewing point of the viewer is shifted in the parallax direction, the length of each filter region 231 in the parallax direction is approximately the same in a visible region. Accordingly, it is possible to maintain the appropriate color balance regardless of the viewing position of the viewer.

<Third Embodiment>
[Regarding the Arrangement of Filter Regions]

In the above explanation, the adjustment of the y-direction length of the filter region in each sub-pixel of the light modulation panel 32 is performed by providing a light shielding region on a color filter. However, it is also possible to change the size of a sub-pixel itself according to each color in order to set the width of the sub-pixel in the y direction to a different width for each color.

In such a case, as shown in FIG. 11, a color filter of each color of R, G, and B is provided in each pixel of the light modulation panel 32 shown in FIG. 2, for example. In addition, sections in FIG. 11 corresponding to the sections in FIG. 2 are denoted by the same reference numerals, and the explanation will be appropriately omitted.

In addition, parts of the light modulation panel 32 and the switch liquid crystal layer 84 are shown in FIG. 11. In FIG. 11, the horizontal direction, the vertical direction, and the depth direction indicate x, y, and z directions, respectively. Moreover, in FIG. 11, the switch liquid crystal layer 84 is shown in a state shifted downward from the light modulation panel 32 in the drawing, for the sake of explanation.

In the example shown in FIG. 11, pixels 261R-1 and 261R-2 on which an image for the right eye is displayed at the time of display of a stereoscopic image and pixels 261L-1 and 261L-2 on which an image for the left eye is displayed at the time of display of a stereoscopic image are provided in the light modulation panel 32.

In addition, hereinafter, the pixels 261R-1 and 261R-2 are simply called a pixel 261R when it is not necessary to distinguish the pixels 261R-1 and 261R-2 in particular, and the pixels 261L-1 and 261L-2 are simply called a pixel 261L when it is not necessary to distinguish the pixels 261L-1 and 261L-2 in particular. In addition, the pixels 261R and 261L are simply called a pixel 261 hereinafter when it is not necessary to distinguish the pixels 261R and 261L in particular.

Each pixel 261 provided in the light modulation panel 32 includes a color filter, the light transmissive section 71 for each color, and the like, and is also a region where each pixel of a stereoscopic image is displayed. In the light modulation panel 32, the pixels 261R and 261L are arrayed alternately in the x direction.

For example, the pixel 261R has one light transmissive section 71R, and light transmitted through the light transmissive section 71R is transmitted through a color filter of each color of the pixel 261R and is then incident on the parallax barrier 33.

In addition, in FIG. 11, the region of an R color filter of each pixel 261 is a region which is shaded by oblique lines and in which the letter "R" is written. In addition, the region of a G color filter is a region which is shaded by vertical lines and in which the letter "G" is written, and the region of a B color filter is a region which is shaded by horizontal lines and in which the letter "B" is written.

More specifically, sub-pixels SBR31, SBG31, and SBB31 having a color filter of each color are provided in the pixel 261, as shown at the left side in FIG. 11, for example. Although each color filter is provided on the filter surface of the counter substrate 63, which forms the pixel 261, facing the liquid crystal layer 65, a region other than the sub-pixels SBR31 to SBB31 on this filter surface is a light shielding region for blocking light.

In addition, the widths of the sub-pixels SBR31 to SBB31 in the y direction are different. In addition, in the pixel 261, a filter region 271R of an R color filter is provided in the entire region of the sub-pixel SBB31.

Similarly, a filter region 271G of a G color filter is provided in the entire region of the sub-pixel SBG31, and a filter region 271B of a B color filter is provided in the entire region of the sub-pixel SBB31.

In addition, the filter regions 271R to 271B are also simply called a filter region 271 hereinafter when it is not necessary to distinguish the filter regions 271R to 271B in particular.

Thus, the filter region 271 through which light beams of respective colors of R, G, and B, among light beams incident from the backlight 31, are transmitted is provided in each pixel 261. Then, the light beams of respective colors transmitted through these filter regions 271 are incident on the eyes of the viewer through the parallax barrier 33, and the stereoscopic image is perceived by the viewer.

In each pixel 261, the amount of transmitted light of each color is adjusted by making the length of the filter region 271 of each color of R, G, and B in the x direction (parallax direction) approximately equal and making different the length of the filter region 271 of each color in the y direction.

Particularly in the pixel 261, since a light shielding region is not provided in the sub-pixels SBR31 to SBB31, the size of each sub-pixel, that is, the size of the pixel 261 is reduced as much as the region. Thus, the pixel 261 has a configuration in which the color filter is not blocked by the light shielding member. The light modulation panel 32 can be manufactured more easily by adopting a configuration in which a light shielding member is not provided on a color filter.

As described above, also in the pixel 261, the length of the filter region 271 of each color in the parallax direction is approximately the same. For this reason, even if the viewing point of the viewer is shifted in the parallax direction, the length of each filter region 271 in the parallax direction is approximately the same in a visible region. Accordingly, it is possible to maintain the appropriate color balance regardless of the viewing position of the viewer.

<Fourth Embodiment>

[Regarding the Arrangement of Filter Regions]

Although the case where the stereoscopic image including an image for the left eye and an image for the right eye is displayed has been described in the above, the stereoscopic image display device 11 may also display a multi-viewing-point stereoscopic image including a plurality of images of three or more viewing points.

In such a case, as shown at the left side in FIG. 12, a color filter of each color of R, G, and B is provided in each pixel of the light modulation panel 32 shown in FIG. 9, for example. In addition, sections in FIG. 12 corresponding to the sections in FIG. 2 are denoted by the same reference numerals, and the explanation will be appropriately omitted. Moreover, in FIG. 12, the horizontal direction, the vertical direction, and the depth direction are assumed to be x, y, and z directions, respectively.

In addition, in the example shown in FIG. 12, the display unit 21 has a configuration in which the parallax barrier 33 is disposed between the light modulation panel 32 and the backlight 31.

Sub-pixels SBR41, SBG41, and SBB41 having a color filter of each color are provided in the pixel 301 shown at the left side in FIG. 12. Although each color filter is provided on the filter surface of the counter substrate 63, which forms the pixel 301, facing the liquid crystal layer 65, a region other than the sub-pixels SBR41 to SBB41 on this filter surface is a light shielding region for blocking light.

In addition, the widths of the sub-pixels SBR41 to SBB41 in the y direction are approximately the same. In addition, in the pixel 301, a filter region 302R of an R color filter and a light shielding region which blocks light are provided in the sub-pixel SBR41.

In the sub-pixel SBR41, a region other than the filter region 302R on the filter surface is a light shielding region. This light shielding region is formed by covering the upper and lower edges of the R color filter in the drawing, which forms the filter region 302R, with a light shielding member.

Similarly, in the sub-pixel SBG41, a filter region 302G of a G color filter and a light shielding region which blocks light are provided. Also in the sub-pixel SBG41, the light shielding region is formed by covering the upper and lower edges of the G color filter in the drawing, which forms the filter region 302G, with a light shielding member. In addition, a filter region 302B of a B color filter is provided in the entire region of the sub-pixel SBB41.

Thus, a filter region through which light beams of respective colors of R, G, and B, among light beams incident from the backlight 31 through the parallax barrier 33, are transmitted is provided in each pixel 301. Then, the light beams of respective colors transmitted through these filter regions 302R to 302B are incident on the eyes of the viewer, and the stereoscopic image is perceived by the viewer.

Moreover, in each pixel 301, the amount of transmitted light of each color (aperture ratio of a filter region) is adjusted by making the lengths of the filter regions 302R to 302B of respective colors of R, G, and B in the x direction (parallax direction) approximately equal and making different the length of the filter regions 302R to 302B in the y direction. That is, the color balance is adjusted by the lengths of the filter regions 302R to 302B in the y direction.

On the filter surface of the light modulation panel 32, the same pixels as the pixel 301 are arrayed, as shown at the right side in the drawing. Moreover, in FIG. 12, parts of the light modulation panel 32 and the switch liquid crystal layer 84 are shown, and the switch liquid crystal layer 84 is shown in a state shifted rightward from the light modulation panel 32 in the drawing, for the sake of explanation.

For example, when a multi-viewing-point stereoscopic image including four different viewing points of viewing points V1 to V4 is displayed on the light modulation panel 32, an image of one viewing point V1 is displayed in regions PVR1 and PVR5 on the filter surface.

In addition, an image of the viewing point V2 is displayed in regions PVR2 and PVR6 on the filter surface, an image of the viewing point V3 is displayed in a region PVR3, and an image of the viewing point V4 is displayed in a region PVR4. That is, on the filter surface, the images of the viewing points V1 to V4 are displayed so as to be arrayed repeatedly and in order in the x direction.

Then, two images of two viewing points displayed adjacent to each other, among the viewing points V1 to V4, are perceived by the left and right eyes respectively of the viewer, so that the stereoscopic image is observed.

In addition, in FIG. 12, the region of an R color filter of each pixel is a region which is shaded by oblique lines and in which the letter "R" is written. In addition, the region of a G color filter is a region which is shaded by vertical lines and in which the letter "G" is written, and the region of a B color filter is a region which is shaded by horizontal lines and in which the letter "B" is written.

For example, although the image of the viewing point V1 is displayed in the region PVR1, an R filter region 303R, a B filter region 303B, and a G filter region 303G in the region PVR1 function as one pixel at the time of display of a stereoscopic image. That is, R, B, and G components of one pixel of the image of the viewing point V1 are displayed in the filter regions 303R, 303B, and 303G, respectively.

In this case, the widths of the filter regions 303R to 303G in the x direction are approximately the same, and the widths of the filter regions 303R to 303G in the y direction are different. The color balance of R, G, and B is adjusted by the widths of the filter regions in the y direction.

In addition, in the case of displaying a multi-viewing-point stereoscopic image, when a voltage is applied to electrodes of the transparent plate 82 and the transparent plate 83, a parallax barrier shown at the right side in FIG. 12 is formed in the switch liquid crystal layer 84. That is, a parallax barrier including light shielding regions 311-1 to 311-3, which block light incident from the backlight 31, and slit regions 312-1 and 312-2, through which light incident from the backlight 31 is transmitted, is formed.

In addition, hereinafter, the light shielding regions 311-1 to 311-3 are also simply called a light shielding region 311 when it is not necessary to distinguish the light shielding regions 311-1 to 311-3, and the slit regions 312-1 and 312-2 are also simply called a slit region 312 when it is not necessary to distinguish the slit regions 312-1 and 312-2.

The parallax barrier shown in FIG. 12 is a striped barrier in which the light shielding region 311 and the slit region 312, each of which has a rectangular shape extending in the y direction, are alternately formed in the x direction. When such a parallax barrier is formed, for example, regions Q11 and Q12 on the filter surface become a visible region of the right eye of the viewer when the viewer observes the stereoscopic image display device 11 from a predetermined viewing position.

That is, only the image of the viewing point V1 displayed in the regions Q11 and Q12, among the images of the viewing points V1 to V4, is observed (perceived) by the right eye of the viewer. In this case, light which is incident from the backlight 31 through the slit region 312-1 and is then transmitted through each filter region in the region Q11 is incident on the right eye of the viewer. Similarly, light which is incident from the backlight 31 through the slit region 312-2 and is then transmitted through each filter region in the region Q12 is incident on the right eye of the viewer.

Moreover, in this case, light which is incident from the backlight 31 through the slit regions 312-1 and 312-2 and is then transmitted through each filter region in the regions PVR2 and PVR6 on the filter surface is incident on the left eye of the viewer. That is, the image of the viewing point V2 displayed in the regions PVR2 and PVR6 is perceived by the left eye of the viewer.

Accordingly, a stereoscopic image including the image of the viewing point V1 and the image of the viewing point V2 is perceived by the viewer. If the viewing position of the viewer moves, the visible region on the filter surface also moves. In this case, images of different viewing points, such as images of the viewing points V2 and V3, are observed by the left and right eyes of the viewer, for example.

Thus, also when displaying a multi-viewing-point stereoscopic image, the appropriate color balance can be obtained more easily by making the x-direction lengths of filter regions of respective colors, which are arrayed in the y direction on the filter surface, approximately equal and making the y-direction lengths of the filter regions different. In addition, since the length of each filter region in the x direction length is approximately the same, the length of each filter region in the x direction is approximately the same in a visible region even if the viewing point of the viewer is shifted in the x direction. Therefore, it is possible to maintain the appropriate color balance.

<Fifth Embodiment>

[Regarding the Arrangement of Filter Regions]

Moreover, although the case where the striped parallax barrier is formed in the switch liquid crystal layer 84 when displaying a multi-viewing-point stereoscopic image has been described in the above, the parallax barrier when displaying the multi-viewing-point stereoscopic image may have any shape.

Examples of the parallax barrier in such a case include a barrier in which parallelogram-shaped slit regions are arrayed in the x direction at predetermined distances and a step barrier in which slit regions, in which rectangular regions can be arrayed in the oblique direction, are arrayed in the x direction at predetermined distances.

For example, when a step barrier is used for display of a stereoscopic image, a stepped parallax barrier is formed in the switch liquid crystal layer 84 when a voltage is applied to electrodes of the transparent plate 82 and the transparent plate 83, as shown in FIG. 13.

In addition, sections in FIG. 13 corresponding to the sections in FIG. 9 are denoted by the same reference numerals, and the explanation will be appropriately omitted. Moreover, in FIG. 13, the horizontal direction, the vertical direction, and the depth direction are assumed to be x, y, and z directions, respectively. Moreover, in FIG. 13, parts of the light modulation panel 32 and the switch liquid crystal layer 84 are shown, and the switch liquid crystal layer 84 is shown in a state shifted rightward from the light modulation panel 32 in the drawing, for the sake of explanation.

In addition, in the example shown in FIG. 13, the display unit 21 has a configuration in which the parallax barrier 33 is disposed between the light modulation panel 32 and the backlight 31.

In the example shown in FIG. 13, pixels with the same configuration as the pixel 301 shown in FIG. 12 are arrayed in a matrix in the xy direction on the filter surface of the light modulation panel 32. Here, the region of an R color filter of each pixel is a region which is shaded by oblique lines and in which the letter "R" is written. In addition, the region of a G color filter is a region which is shaded by vertical lines and in which the letter "G" is written, and the region of a B color filter is a region which is shaded by horizontal lines and in which the letter "B" is written.

For example, when a multi-viewing-point stereoscopic image including four different viewing points of viewing points V1 to V4 is displayed on the light modulation panel 32, an image of one viewing point V1 is displayed in regions PVR21, PVR25, and PVR29 on the filter surface.

In addition, an image of the viewing point V2 is displayed in regions PVR22 and PVR26 on the filter surface, an image of the viewing point V3 is displayed in regions PVR23 and PVR27, and an image of the viewing point V4 is displayed in regions PVR24 and PVR28. That is, on the filter surface, the images of the viewing points V1 to V4 are displayed so as to be arrayed repeatedly and in order in the x direction.

Then, two images of two viewing points displayed adjacent to each other, among the viewing points V1 to V4, are perceived by the left and right eyes respectively of the viewer, so that the stereoscopic image is observed.

For example, although the image of the viewing point V1 is displayed in the region PVR21, an R filter region 341R, a G filter region 341G, and a B filter region 341B in the region PVR21 function as one pixel at the time of display of a stereoscopic image. That is, R, G, and B components of one pixel of the image of the viewing point V1 are displayed in the filter regions 341R, 341G, and 341B, respectively.

In this case, the widths of the filter regions 341R to 341B in the x direction are approximately the same, and the widths of the filter regions 341R to 341B in the y direction are different. The color balance of R, G, and B is adjusted by the widths of the filter regions in the y direction.

Moreover, in this case, a parallax barrier including light shielding regions 351-1 to 351-3, which block light incident from the backlight 31, and slit regions 352-1 to 352-3, through which light incident from the backlight 31 is transmitted, is formed in the switch liquid crystal layer 84.

In addition, hereinafter, the light shielding regions 351-1 to 351-3 are also simply called a light shielding region 351 when it is not necessary to distinguish the light shielding regions 351-1 to 351-3, and the slit regions 352-1 and 352-2 are also simply called a slit region 352 when it is not necessary to distinguish the slit regions 352-1 and 352-2.

The slit region 352 shown in FIG. 13 is a region where rectangular regions, which are long in the y direction, can be arrayed in the lower right direction in the drawing, and the parallax barrier is a stepped barrier in which the light shielding region 351 and the slit region 352 are arrayed alternately in the x direction.

When such a parallax barrier is formed, for example, regions Q21 to Q23 on the filter surface become a visible region of the right eye of the viewer when the viewer observes the stereoscopic image display device 11 from a predetermined viewing position.

That is, only the image of the viewing point V1 displayed in the regions Q21 to Q23, among the images of the viewing points V1 to V4, is observed by the right eye of the viewer. In this case, light which is incident from the backlight 31 through the slit region 352-1 and is then transmitted through each filter region in the region Q21 is incident on the right eye of the viewer.

Similarly, light which is incident from the backlight 31 through the slit region 352-2 and is then transmitted through each filter region in the region Q22 is incident on the right eye of the viewer, and light which is incident from the backlight 31 through the slit region 352-3 and is then transmitted through each filter region in the region Q23 is incident on the right eye of the viewer.

Moreover, in this case, light which is incident from the backlight 31 through the slit regions 352-1 and 352-2 and is then transmitted through each filter region in the regions PVR22 and PVR26 on the filter surface is incident on the left eye of the viewer. That is, the image of the viewing point V2 displayed in the regions PVR22 and PVR26 is perceived by the left eye of the viewer.

Accordingly, a stereoscopic image including the image of the viewing point V1 and the image of the viewing point V2 is perceived by the viewer. If the viewing position of the viewer moves, the visible region on the filter surface also moves. In this case, images of different viewing points are observed by the left and right eyes of the viewer.

Thus, also when using a step barrier, a stereoscopic image with the appropriate color balance can be displayed more easily by making the x-direction lengths of filter regions of respective colors, which are arrayed on the filter surface, approximately equal and making the y-direction lengths of the filter regions different. In addition, since the length of each filter region in the x direction length is approximately the same, the length of each filter region in the x direction is approximately the same in a visible region even if the viewing point of the viewer is shifted in the x direction. Therefore, it is possible to maintain the appropriate color balance.

In addition, although the case where a stereoscopic image is displayed using the parallax barrier method has been described in the above, any method, such as a lenticular lens method may be used to display the stereoscopic image. For example, when displaying a stereoscopic image using a lenticular lens method, images of the respective viewing points are optically separated by the lenticular lens provided in the display unit 21.

In addition, although the case where the present disclosure is applied to the stereoscopic image display device that displays a stereoscopic image has been described as an example in the above, the present disclosure may also be applied to display devices, such as a multi-display. In the multi-display, when a display screen is viewed simultaneously from different viewing positions, such as a driver's seat and a passenger seat, image display is performed so that different two-dimensional images are observed from the respective viewing positions.

In addition, embodiments of the present disclosure are not limited to the above-described embodiments, and various modifications may also be made without departing from the spirit and scope of the present disclosure.

The present disclosure contains subject matter related to that disclosed in Japanese Priority Patent Application JP 2011-056992 filed in the Japan Patent Office on Mar. 15, 2011, the entire contents of which are hereby incorporated by reference.

What is claimed is:

1. A display device comprising:
   display unit in which a plurality of pixels are arrayed in a matrix, each of the pixels including a first sub-pixel, a second sub-pixel, and a third sub-pixel arrayed in a line along a vertical direction substantially perpendicular to a parallax direction of a stereoscopic image including images of a plurality of viewing points; and
   a separation unit that separates optically the images of the respective viewing points from each other so that the images of at least four viewing points are observed by a viewer, the separation unit having a slit region through which light is transmitted, and a light shielding region for blocking light, the slit region and the light shielding region extending in the vertical direction and being arranged alternately in the parallax direction,
   wherein each of the pixels has a first region, a second region, and a third region, the first region being a region in which the first sub-pixel emits a first color light for displaying the stereoscopic image, the second region being a region in which the second sub-pixel emits a second color light for displaying the stereoscopic image that is different from the first color light, and the third region being a region in which the third sub-pixel emits a third color light for displaying the stereoscopic image that is different from the first color light and the second color light, wherein sub-pixels adjacent to each other in the parallax direction emit different color light, and wherein, in a region on the display unit in which the image of a predetermined viewing point observed by the viewer is displayed, the first, second and third regions of each pixel have substantially the same width in the parallax direction, and the first, second and third regions of each pixel have different heights in the vertical direction.

2. The display device according to claim 1, wherein the display unit includes a first column, a second column, and a third column, wherein each of the first, second, and third columns is a column in which the first, second, and third sub-pixels are arranged in the vertical direction, wherein the second column is arranged adjacent to the first column, wherein the third column is arranged adjacent to the second column, wherein the first sub-pixel of the first column is adjacent to the second sub-pixel of the second column in the parallax direction, and wherein the second sub-pixel of the second column is adjacent to the third sub-pixel of the third column in the parallax direction.

3. The display device according to claim 1, wherein, in a region on the display unit in which the image of a predetermined viewing point observed by the viewer is displayed, the width in the vertical direction of the third region is greater than the width in the vertical direction of the first region and the width in the vertical direction of the second region.

4. The display device according to claim 1, wherein the third color light is a blue color light, and either the first color light or the second color light is a red color light.

5. The display device according to claim 1, wherein the display unit includes wiring lines arranged between the first region and the second region and between the second region and the third region, and the wiring lines extend along one edge, which extends in the parallax direction, of the second region.

* * * * *